(12) United States Patent
Yang

(10) Patent No.: US 12,430,314 B2
(45) Date of Patent: Sep. 30, 2025

(54) DATABASE OPERATION METHOD AND APPARATUS, DEVICE AND STORAGE MEDIUM

(71) Applicant: CLOUD INTELLIGENCE ASSETS HOLDING (SINGAPORE) PRIVATE LIMITED, Singapore (SG)

(72) Inventor: Yuming Yang, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/843,621

(22) PCT Filed: Feb. 21, 2023

(86) PCT No.: PCT/CN2023/077340
§ 371 (c)(1),
(2) Date: Sep. 3, 2024

(87) PCT Pub. No.: WO2023/165374
PCT Pub. Date: Sep. 7, 2023

(65) Prior Publication Data
US 2025/0181569 A1 Jun. 5, 2025

(30) Foreign Application Priority Data
Mar. 4, 2022 (CN) .................. 202210208474.X

(51) Int. Cl.
*G06F 16/00* (2019.01)
*G06F 16/22* (2019.01)
*G06F 16/23* (2019.01)

(52) U.S. Cl.
CPC ...... *G06F 16/2343* (2019.01); *G06F 16/2246* (2019.01)

(58) Field of Classification Search
None
See application file for complete search history.

(56) References Cited

U.S. PATENT DOCUMENTS 5,218,696 A * 6/1993 Baird ................. G06F 16/13
707/E17.037
7,370,055 B1 * 5/2008 Pande ................ G06F 16/9027
707/692

(Continued)

FOREIGN PATENT DOCUMENTS

CN 103077174 A 5/2013
CN 105843809 A 8/2016

(Continued)

OTHER PUBLICATIONS

International Search Report and Written Opinion dated May 12, 2023 for International Application No. PCT/CN2023/077340.

(Continued)

*Primary Examiner* — Jean M Corrielus

(57) ABSTRACT

A database operation method and apparatus, a device and a storage medium are provided. The method includes: traversing, by a writing thread, from a root node of a multiway tree to search a target index record matching a search keyword of a writing operation; and applying for adding, by the writing thread according to a locking rule, exclusive locks for memory pages corresponding to a target node where the target index record is located and other nodes needing associated modification.

20 Claims, 12 Drawing Sheets

A writing thread traverses from a root node of the multiway tree to search a target index record matching a search keyword of a writing operation, so as to find a target node where the target index record is located — 41

If the writing operation needs to trigger a structure modification operation, the writing thread applies for adding, according to a locking rule, exclusive locks for memory pages corresponding to the target node and other nodes needing associated modification, so as to modify the target node and the other nodes accordingly after successfully adding the exclusive locks for the target node and the other nodes; where the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released, and a preset mark needs to be set for the memory page corresponding to the any node; and a lock held by itself needs to be released if any memory page for which adding an exclusive lock is applied has been set with the preset mark by another writing thread — 42

(56) References Cited

U.S. PATENT DOCUMENTS

| | | | | |
|---|---|---|---|---|
| 7,424,477 | B1* | 9/2008 | Martin | G06F 9/524 |
| | | | | 707/999.102 |
| 9,426,259 | B2* | 8/2016 | Gower | G06F 9/542 |
| 2004/0117345 | A1* | 6/2004 | Bamford | G06F 16/27 |
| 2006/0137049 | P1* | 6/2006 | Gerdts | A01H 5/08 |
| | | | | Plt./190 |
| 2009/0182709 | A1* | 7/2009 | Ritchie | G06F 16/2246 |
| | | | | 707/E17.05 |
| 2009/0235273 | A1* | 9/2009 | Petersen | G06F 9/524 |
| | | | | 718/106 |
| 2011/0145499 | A1* | 6/2011 | Ananthanarayanan | |
| | | | | G06F 12/0866 |
| | | | | 711/E12.016 |
| 2012/0311065 | A1* | 12/2012 | Ananthanarayanan | |
| | | | | G06F 16/172 |
| | | | | 709/213 |
| 2013/0204902 | A1* | 8/2013 | Wang | G06F 16/2365 |
| | | | | 707/E17.012 |
| 2014/0030055 | A1* | 1/2014 | Jayaram | F04D 29/18 |
| | | | | 416/223 R |
| 2014/0074841 | A1* | 3/2014 | Majnemer | G06F 16/2246 |
| | | | | 707/E17.002 |
| 2014/0204860 | A1* | 7/2014 | Kim | F25D 29/00 |
| | | | | 68/12.02 |
| 2014/0310317 | A1* | 10/2014 | Spillane | G06F 16/9027 |
| | | | | 707/803 |
| 2014/0330802 | A1* | 11/2014 | Preslan | H04L 67/1031 |
| | | | | 707/704 |
| 2015/0032758 | A1* | 1/2015 | Schneider | G06F 16/2272 |
| | | | | 707/741 |
| 2015/0222730 | A1* | 8/2015 | Gower | H04L 65/70 |
| | | | | 709/203 |
| 2016/0162526 | A1* | 6/2016 | McConnell | G06F 16/24568 |
| | | | | 707/741 |
| 2016/0196290 | A1* | 7/2016 | Lyle | G06F 16/2365 |
| | | | | 707/741 |
| 2016/0239529 | A1* | 8/2016 | Bulkowski | G06F 16/278 |
| 2016/0314159 | A1* | 10/2016 | Liang | G06F 16/21 |
| 2017/0286516 | A1* | 10/2017 | Horowitz | G06F 16/2365 |
| 2018/0039685 | A1* | 2/2018 | Prophete | H04L 67/1095 |
| 2018/0307737 | A1* | 10/2018 | Xie | G06F 16/275 |
| 2018/0340444 | A1* | 11/2018 | Jausovec | F01D 9/041 |
| 2019/0005083 | A1* | 1/2019 | Cook | G06F 16/27 |
| 2021/0200721 | A1* | 7/2021 | Becker | G06F 16/2336 |

FOREIGN PATENT DOCUMENTS

| | | | | |
|---|---|---|---|---|
| CN | 107783988 | A | 3/2018 | |
| CN | 109857566 | A | 6/2019 | |
| CN | 110162525 | A | 8/2019 | |
| CN | 110990404 | A | 4/2020 | |
| CN | 111611246 | A | 9/2020 | |
| CN | 112214649 | A | 1/2021 | |
| CN | 112306991 | A | 2/2021 | |
| CN | 113127211 | A | 7/2021 | |
| CN | 114282074 | A | 4/2022 | |
| EP | 3091447 | B1 * | 8/2018 | G06F 16/21 |
| WO | 2014177201 | A1 | 11/2014 | |

OTHER PUBLICATIONS

First Office Action dated Apr. 18, 2022 for Chinese Application No. 202210208474.X.

Notification to Grant Patent Rights for invention dated May 20, 2022 for Chinese Application No. 202210208474.X.

Safdar Jamil et al. "Towards Scalable Manycore-aware Persistent B+-Trees for Efficient Indexing in Cloud Environments" Published in: 2021 IEEE International Conference on Autonomic Computing and Self-Organizing Systems Companion; Sep. 27, 2021-Oct. 1, 2021; 6 pages.

Cat Kang, "Locking history of B+ database" pp. 1-9, Jan. 28, 2022; https://shuanlan.zhihu.com/p/462576086.

* cited by examiner

| A writing thread traverses from a root node of the multiway tree to search a target index record matching a search keyword of a writing operation, so as to find a target node where the target index record is located | ~ 41 |

| If the writing operation needs to trigger a structure modification operation, the writing thread applies for adding, according to a locking rule, exclusive locks for memory pages corresponding to the target node and other nodes needing associated modification, so as to modify the target node and the other nodes accordingly after successfully adding the exclusive locks for the target node and the other nodes; where the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released, and a preset mark needs to be set for the memory page corresponding to the any node; and a lock held by itself needs to be released if any memory page for which adding an exclusive lock is applied has been set with the preset mark by another writing thread | ~ 42 |

FIG. 4

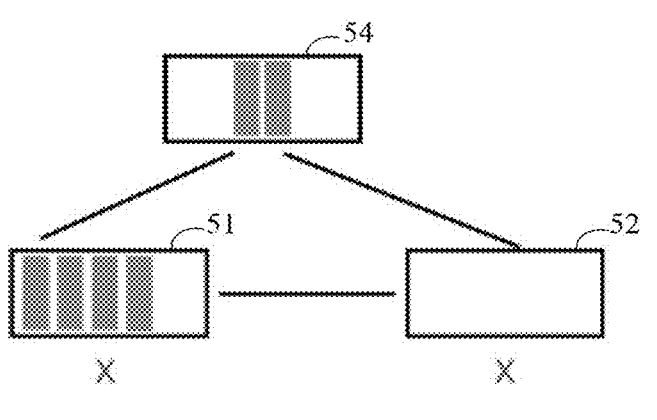

FIG. 5A

DATABASE OPERATION METHOD AND APPARATUS, DEVICE AND STORAGE MEDIUM

CROSS-REFERENCE TO RELATED APPLICATIONS

This application is a National Stage of International Application No. PCT/CN2023/077340, filed on Feb. 21, 2023, which claims priority to Chinese Patent Application No. 202210208474.X, filed to China National Intellectual Property Administration on Mar. 4, 2022 and entitled "DATABASE OPERATION METHOD AND APPARATUS, DEVICE AND STORAGE MEDIUM", both of which are hereby incorporated by reference in their entireties.

TECHNICAL FIELD

The present application relates to the technical field of database and, in particular, to a database operation method and apparatus, a device and a storage medium.

BACKGROUND

At present, tables in a database can be stored by using a multiway tree, and the multiway tree could be, for example, a balanced multiway search tree (B-Tree), a B+Tree, etc.

Generally, if one writing thread needs to modify the structure of a multiway tree, this writing thread needs to first add a read-write lock (SX latch) to the whole multiway tree. By adding a read-write lock to the whole tree, in the process of this writing thread modifying the structure of the multiway tree, the conflict caused by other writing threads also modifying the structure of the multiway tree can be avoided. If there is another writing thread also needs to modify the structure of the multiway tree, it needs to wait until this writing thread releases the read-write lock added to the whole multiway tree.

Therefore, there is a problem that Structure Modification Operations (SMOs) for the same multiway tree cannot be concurrent, resulting in low processing efficiency.

SUMMARY

Embodiments of the present application provide a database operation method and apparatus, a device and a storage medium, to solve the problem in the prior art that structure modification operations for the same multiway tree cannot be concurrent, resulting in low processing efficiency.

In a first aspect, an embodiment of the present application provides a database operation method, where the database uses a multiway tree as an index, a one-to-one correspondence is between nodes of the multiway tree and memory pages, and the method includes:
traversing, by a writing thread, from a root node of the multiway tree to search a target index record matching a search keyword of a writing operation, so as to find a target node where the target index record is located; and
if the writing operation needs to trigger a structure modification operation, applying for adding, by the writing thread according to a locking rule, exclusive locks for memory pages corresponding to the target node and other nodes needing associated modification, so as to modify the target node and the other nodes accordingly after successfully adding the exclusive locks for the target node and the other nodes; where the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released and a preset mark needs to be set for the memory page corresponding to the any node; and a lock held by itself needs to be released if any memory page for which adding an exclusive lock is applied has been set with the preset mark by another writing thread.

In a second aspect, an embodiment of the present application provides a database operation apparatus, where the database uses a multiway tree as an index, a one-to-one correspondence is between nodes of the multiway tree and memory pages, and the apparatus includes:
a searching module, configured to traverse from a root node of the multiway tree to search a target index record matching a search keyword of a writing operation, so as to find a target node where the target index record is located; and
a modifying module, configured to: if the writing operation needs to trigger a structure modification operation, apply for adding, according to a locking rule, exclusive locks for memory pages corresponding to the target node and other nodes needing associated modification, so as to modify the target node and the other nodes accordingly after successfully adding the exclusive locks for the target node and the other nodes; where the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released and a preset mark needs to be set for the memory page corresponding to the any node; and a lock held by itself needs to be released if any memory page for which adding an exclusive lock is applied has been set with the preset mark by another data operation apparatus.

In a third aspect, an embodiment of the present application provides a computer device, which includes a memory and a processor; where the memory is used for storing one or more computer instructions, and when the one or more computer instructions are executed by the processor, any one of the methods as described in the first aspect is implemented.

In a fourth aspect, an embodiment of the present application provides a computer-readable storage medium having a computer program stored thereon, where when the computer program is executed, any one of the methods as described in the first aspect is implemented.

An embodiment of the present application further provides a computer program, where the computer program, when executed by a computer, is used to implement any one of the methods as described in the first aspect.

In the embodiments of the present application, a writing thread does not apply for adding a read-write lock for a whole multiway tree, but applies for adding exclusive locks for memory pages corresponding to a target node and other nodes needing associated modification according to a locking rule, so as to modify the target node and the other nodes accordingly after successfully adding the exclusive locks for the target node and the other nodes, and the target node refers to a found node where an index record matching a search keyword is located. It is realized that a single writing thread can modify the structure of the multiway tree by only adding exclusive locks for memory pages corresponding to nodes needing to be modified in the multiway tree, so that conflicts between multiple writing threads are at the page level, and so that structure modification operations for the same multiway tree can be concurrent, thereby improving the processing efficiency. In addition, the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released and a preset mark needs to be set for the memory page corresponding to the any node; and a lock held by itself needs to be released if any memory page for which adding an exclusive lock is applied has been set with the preset mark by another writing thread, which allows to apply for locking according to the locking rule, and the problem of a deadlock between threads can be avoided.

BRIEF DESCRIPTION OF DRAWINGS

In order to more clearly illustrate the technical solutions of the embodiments of the present application or the prior art, the drawings needed to be used in the description of the embodiments or the prior art will be briefly introduced below. Obviously, the drawings in the following description are some embodiments of the present application, and for those skilled in the art, other drawings can be obtained according to these drawings without paying creative efforts.

FIG. 4 is a schematic flowchart of a database operation method according to an embodiment of the present application.

FIGS. 5A-5D are schematic diagrams of a processing process of an inserting operation according to an embodiment of the present application.

DESCRIPTION OF EMBODIMENTS

In order to make objects, technical solutions and advantages of the embodiments of the present application clearer, the technical solutions in the embodiments of the present application will be clearly and comprehensively described in connection with the drawings in the embodiments of the present application. Obviously, the described embodiments are a part of embodiments of the present application, rather than all embodiments. Based on the embodiments in the present application, all other embodiments obtained by one of ordinary skill in the art without paying creative efforts belong to the protection scope of the present application.

Terms used in the embodiments of the present application are only for the purpose of describing specific embodiments and are not intended to limit the present application. Singular forms of "a", "the" and "this" used in the embodiments of the present application and the appended claims are also intended to include plural forms, unless the context clearly indicates other meaning, and "multiple" generally includes at least two, but does not exclude the case of including at least one.

It should be understood that the term "and/or" used herein is only an association relationship describing associated objects and means that there can be three kinds of relationships. For example, A and/or B can represent three situations: A exists alone, A and B exist at the same time, and B exists alone. In addition, the character "/" herein generally indicates that context objects are an "or" relationship.

Depending on the context, the words "if" and "in case" as used herein can be interpreted as "while" or "when" or "in response to determination" or "in response to detection". Similarly, depending on the context, the phrases "if determined" or "if detected (stated condition or event)" can be interpreted as "when determined" or "in response to determination" or "when detected (stated condition or event)" or "in response to detection (stated condition or event)".

It should also be noted that the terms "include", "contain" or any other variation thereof are intended to cover non-exclusive inclusion, so that a commodity or system including a series of elements not only includes those elements, but also includes other elements not explicitly listed, or includes elements inherent to such commodity or system. Without more restrictions, an element limited by the phrase "include one . . . " does not exclude the existence of other identical elements in the commodity or system that includes the element.

In addition, the sequence of steps in the following various method embodiments is only an example, and is not strictly limited.

The database operation method provided by various embodiments of the present application will be described in detail below through an exemplary application scenario.

Figure 1:
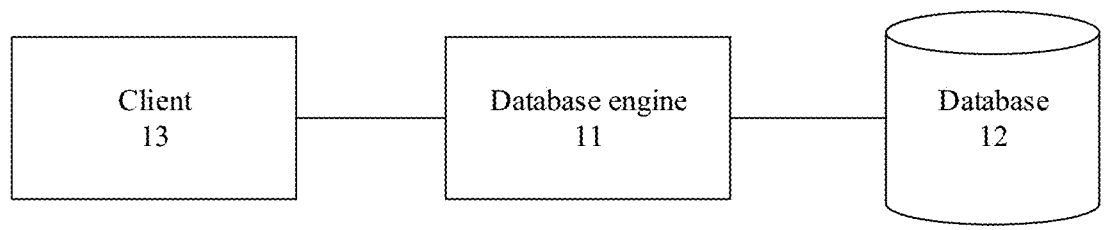
FIG. 1 is a schematic structural diagram of a database access system according to an embodiment of the present application.

FIG. 1 is a schematic structural diagram of a database access system according to an embodiment of the present application. As shown in FIG. 1, the database access system may include a database engine 11 and a Database 12.

The database 12 is a warehouse built on a computer storage device and supporting to organize, store and manage data in a row storage architecture. In the embodiment of the present application, an implementation form of the computer storage device bearing the database 12 is not limited. The database 12 may be, but is not limited to, a row database, and may also be a mixed row-column database.

The database engine 11 is a core service for storing, processing and protecting data, and its task includes processing transactions related to the database 12, such as designing and creating the database 12, saving various lists and documents required by the database 12, and providing daily management support for the database 12 to optimize the performance of the database 12. Taking the database 12 being MySQL database as an example, the database engine 11 could be, for example, InnoDB.

In order to conveniently process the transactions related to the database 12, a communication connection can be established between the database engine 11 and the database 12, which can be a wired or wireless network connection. In an implementation, on the deployment implementation, the database engine 11 and the database 12 can be deployed on a same physical device or different physical devices. When the database engine 11 and the database 12 are deployed on different physical devices, they can be deployed in a same local area network or in different local area networks.

The database engine 11 uses index organization tables, data of each table is put in a corresponding index, and the index is called a clustered index. The purposes of using the index organization tables is to dynamically organize a disk file structure and maintain data records in order; quickly locate records with the help of indexes. Except the clustered index, other indexes in a table are called secondary indexes. Each index record (record) of the secondary indexes contains not only its own columns, but also a primary key of its corresponding data row, and the database engine 11 can use the primary key to find a complete row from the primary index.

The database engine 11 can use a multiway tree as a data structure of the indexes, a one-to-one correspondence is between nodes of the multiway tree and memory pages (page), and a node can be stored in a corresponding memory page. The multiway tree can include, for example, a B-Tree, a B+Tree, etc., and will be described in detail taking the B-Tree as an example. A structure of the B-Tree could have the following characteristics: 1) actual data are all stored in a leaf layer; 2) a non-leaf layer only stores index records (key, page no), and each index record points to a unique child node; 3) a key of an index record is P, and its child nodes can only store index records with key $>=P$ and $<P1$, where P1 is a key of the next index record; 4) nodes of each layer are strung together through a bidirectional linked list.

As shown in FIG. 1, the database access system may further include a client 13. A communication connection between the client 13 and the database engine 11 can be a wired or wireless network connection. In an implementation, the client 13 and the database engine 11 may be located in a same local area network or different local area networks.

The client 13 can be regarded as an interactive interface provided by the database 12 for users, and the users are allowed to access the database 12 through the client 13. When there is a need to access the database 12, the client 13 can send a database access request to the database engine 11, and the database engine 11 can respond to the database access application of the client 13 by performing corresponding operations for the database 12 and returning a corresponding operation result to the client 13.

Based on the database access request sent by the client 13, the database engine 11 can determine an operation type and a search keyword. The operation type may include adding, deleting and querying, an inserting operation and a deleting operation can be collectively referred to as a writing operation, and a querying operation can be referred to as a reading operation. It should be noted that implementation manners about determining the operation type and the searching keyword by the database engine 11 can refer to the specific description in the related art and will not be repeated here.

For the reading operation, the database engine 11 can perform specific operations on the database 12 by creating a corresponding reading thread. For the writing operation, the database engine 11 can perform specific operations on the database 12 by creating a corresponding writing thread. In practical application, there will be a case where a writing thread needs to modify the structure of the multiway tree, and modifying the structure of the multiway tree could include adding nodes to the multiway tree or deleting nodes from the multiway tree. It should be noted that if a writing thread needs to modify the structure of the multiway tree, it means that a writing operation corresponding to the writing thread needs to trigger a structure modification operation.

Suppose that the indexes stored in the multiway tree is regarded as a black box, and it doesn't care about a specific data structure inside, it seems that there are only index records arranged in order outside, and all operations such as reading, inserting and deleting can be completed in one step atomically. At this time, a multi-thread concurrent operation will not perceive the index structure and only need to consider constraints at a transaction level, for example, one transaction in the database engine 11 adds a logic lock for an index record to prevent other transactions to access. However, the actual multiway tree operation is not atomic, for example, one writing thread performing a structure modification operation involves changes of multiple memory pages.

Generally, if one writing thread needs to modify a structure of a multiway tree, this writing thread needs to add a read-write lock to the whole multiway tree, and if there is another writing thread also needs to modify the structure of the multiway tree, it needs to wait until this writing thread releases the read-write lock added to the whole multiway tree. Therefore, there is a problem that a structure modification operation for the same multiway tree cannot be concurrent, resulting in low processing efficiency.

In order to solve the technical problem that a structure modification operation for the same multiway tree cannot be concurrent, resulting in low processing efficiency, in the embodiments of the present application, a writing thread does not apply for adding a read-write lock for a whole multiway tree, but applies for adding exclusive locks (X latch) for memory pages corresponding to a target node and other nodes needing associated modification according to a locking rule, so as to modify the target node and the other nodes accordingly after successfully adding the exclusive locks for the target node and the other nodes, and the target node refers to a found node where an index record matching a search keyword is located. It is realized that a single writing thread can modify the structure of the multiway tree by only adding exclusive locks for memory pages corresponding to nodes needing to be modified in the multiway tree, so that conflicts between multiple writing threads are at the page level, and so that structure modification operations for the same multiway tree can be concurrent, thereby improving the processing efficiency. In addition, the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released and a preset mark needs to be set for the memory page corresponding to the any node; and a lock held by itself needs to be released if any memory page for which adding an exclusive lock is applied has been set with the preset mark by another writing thread, which allows to apply for locking according to the locking rule, and the problem of a deadlock between threads can be avoided.

In the embodiments of the present application, multiple corresponding threads for which a writing operation will trigger a structure modification operation will enter the multiway tree at the same time, and each thread will take exclusive locks of multiple memory pages. In order to avoid a deadlock between threads, the following three locking rules are designed.

Rule 1: A locking direction is specified, and the locking direction can be designed flexibly according to requirements. Exemplarily, the locking direction includes a top-to-down direction and a left-to-right direction along the multiway tree, and the following mainly takes the locking direction being the top-to-down direction and the left-to-right direction along the multiway tree as an example to explain in detail.

Rule 2: If a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released, and a preset mark needs to be set for the memory page corresponding to the any node.

Exemplarily, in a process of performing a structure modification operation by any writing thread, before applying for an exclusive lock of a memory page corresponding to a father node or a neighbor node on the left side, a preset mark needs to be set for a memory page currently holding an exclusive lock, and the exclusive lock currently held needs to be released.

Since the structure modification operation involves modifying nodes from down to top and from right to left, which is opposite to the locking direction from top to down and from left to right, the way of holding an exclusive lock and then adding an exclusive lock in a reverse direction cannot be adopted. Therefore, the embodiments of the present application propose to solve this problem by using a preset mark, where a preset mark is set for a memory page holding an exclusive lock before a thread adds a lock in a reverse direction.

A memory page with a preset mark can indicate that the memory page is in a middle state of the structure modification operation, that is, the structure modification operation for modifying the memory page has not been completed, and the memory page can be recorded as a memory page in a middle state of SMO. Accordingly, a node corresponding to the memory page can be recorded as a node in a middle state of SMO. It should be understood that once any structure modification operation is completed, a preset mark corresponding to the structure modification operation should be cleared.

In an embodiment, a read-write lock can be used as the preset mark. It should be noted that releasing an exclusive lock of a memory page corresponding to any node and adding a read-write lock for the memory page corresponding to the any node can be atomic, that is, releasing the exclusive lock of the memory page corresponding to the any node and adding the read-write lock for the memory page corresponding to the any node can be made at the same time, and that is, the releasing of the exclusive lock and the setting of the preset mark can be completed at the same time. The following mainly takes using a read-write lock as a preset mark as an example to explain in detail.

Figure 2:
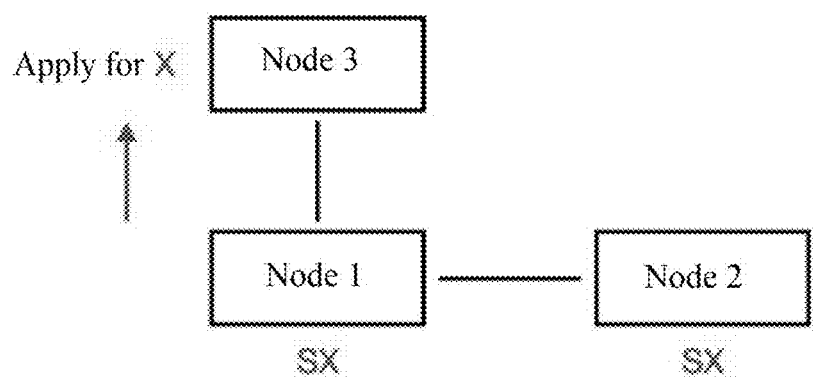
FIG. 2 is a schematic diagram of setting a preset mark according to an embodiment of the present application.

Taking a target node as node 1, a neighbor node on the right side of the target node as node 2, and a father node of the target node as node 3 as an example, as shown in FIG. 2, exclusive locks X of node 1 and node 2 can be downgraded to read-write locks SX before applying for an exclusive lock X of node 3.

Figure 3:
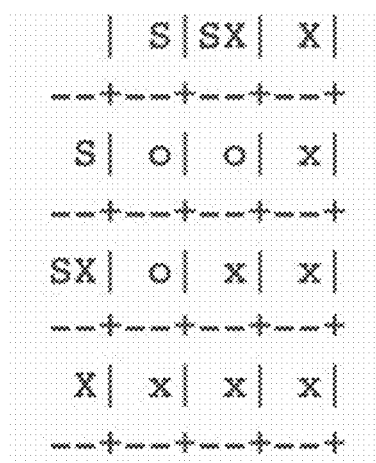
FIG. 3 is a schematic diagram of a compatibility relationship among a read-write lock SX, a shared lock S and an exclusive lock X according to an embodiment of the present application.

In addition to the exclusive lock and the read-write lock, another kind of lock is a shared lock (S latch), and a compatibility relationship among the read-write lock SX, the shared lock S and the exclusive lock X can be shown in FIG. 3, where O represents compatible and X represents incompatible. The first line in FIG. 3 indicates that: on the basis that a thread has added a shared lock for a memory page, other threads can further add a shared lock for the memory page; on the basis that a thread has added a read-write lock for a memory page, other threads can further add a shared lock for the memory page; on the basis that a thread has added an exclusive lock for a memory page, other threads cannot add a shared lock for the memory page. The second line in FIG. 3 indicates that: on the basis that a thread has added a shared lock for a memory page, other threads can further add a read-write lock for the memory page; on the basis that a thread has added a read-write lock for a memory page, other threads cannot add a read-write lock for the memory page; on the basis that a thread has added an exclusive lock for a memory page, other threads cannot add a read-write lock for the memory page. The third line in FIG. 3 indicates that: on the basis that a thread has added a shared lock for a memory page, other threads cannot add an exclusive lock for the memory page; on the basis that a thread has added a read-write lock for a memory page, other threads cannot add an exclusive lock for the memory page; on the basis that a thread has added an exclusive lock for a memory page, other threads cannot add an exclusive lock for the memory page.

Rule 3: a lock held by itself needs to be released if any memory page for which adding an exclusive lock is applied has been set with a preset mark by another writing thread.

If the writing thread does not release the lock it has held, it will occupy and wait with another writing thread who are performing the structure modification operation, resulting in a deadlock. It should be understood that the writing thread should not modify a memory page with a preset mark set by another writing thread, because the previous structure modification operation has not been submitted. When the writing thread traverses to a node with a preset mark, the writing thread can wait until the previous structure modification operation is completed before modifying the node.

In practical application, in order to realize a locking rule that "a lock held by itself needs to be released if any memory page for which adding an exclusive lock is applied has been set with a preset mark by another writing thread", a new mode of applying for adding an exclusive lock for a node can be provided on the basis of the existing mode of applying for adding the exclusive lock for the node. The existing mode can be recorded as a conventional mode, and the new mode can be recorded as an unconventional mode.

For the conventional mode, when a writing thread applies for adding an exclusive lock for a memory page by using the conventional mode, if the memory page is not added with a lock by another thread, the writing thread can directly obtain a result of successful locking; if the memory page has been added with a lock by another thread, the writing thread will be blocked until obtaining a result of successful locking. It can be seen that a result of any writing thread applying for adding an exclusive lock for a memory page by using the conventional mode has only the successful locking. It should be understood that a result of a writing thread applying for adding an exclusive lock for a memory page being successful locking represents that the writing thread has successfully added an exclusive lock for the memory page, that is, the writing thread holds the exclusive lock of the memory page.

For the unconventional mode, when a writing thread applies for adding an exclusive lock for a memory page by using the unconventional mode, if the memory page has been set with a preset mark by another thread, the writing thread can directly obtain a result of failed locking, rather than continuing to wait; if the memory page is not set with a preset mark and is not added with a lock by another thread, the writing thread can directly obtain a result of successful locking; if the memory page is not set with a preset mark but is added with a lock by another thread, the writing thread will be blocked until obtaining a result of successful locking or failed locking. It can be seen that a result of a writing thread applying for adding an exclusive lock for a memory page may be successful locking, and may also be failed locking. It should be understood that a result of a writing thread applying for adding an exclusive lock for a memory page being failed locking represents that the writing thread failed to add an exclusive lock for the memory page, that is, the writing thread does not hold the exclusive lock of the memory page.

It should be noted that when the read-write lock is used as the preset mark, since another writing thread adds a read-write lock for a memory page while releasing an exclusive lock of the memory page, in a case that another writing thread holds the exclusive lock of the memory page, the writing thread applying for an exclusive lock of the corresponding memory page may lead to a situation that the writing thread blocks for a period of time before obtains a result of failed locking.

When a result of the writing thread applying for adding an exclusive lock for any memory page by using the unconventional mode is failed locking, it can represent that the any memory page has been set with a preset mark by another writing thread, so that the writing thread can release the lock held by itself.

In practical application, the writing thread can apply for adding an exclusive lock for a memory page by a way of calling a locking function, and the thread can take a page number (page no) of the memory page as an input of the locking function. In an embodiment, locking functions corresponding to the conventional mode and the unconventional mode may be the same, for example, they are both rw_lock_x_lock_func function. Taking the preset mark being a read-write lock as an example, the writing thread can try to add an exclusive lock in the rw_lock_x_lock_func function, and judge whether the memory page is added with a read-write lock by another thread after failure, and if yes, failed locking is immediately returned.

After the failed locking is returned, the writing thread needs to release the lock held by itself, but it is possible to not retry from the root node (retry from root) immediately, otherwise it may encounter the same memory page with the preset mark again, and constant retry will consume resources of a processor. In this case, the writing thread can wait for a structure modification operation of the memory page to be completed and then retry from the root node. Therefore, after obtaining a result of failed locking for a memory page, the writing thread may not use the unconventional mode to apply for adding the exclusive lock for the memory page, but use the conventional mode to apply for adding the exclusive lock for the memory page, in this way, the writing thread could block until the structure modification operation of another writing thread are completed and release the exclusive lock.

Some implementation forms of the present application will be described below in detail in combination of the drawings. In a case of no conflict, the following embodiments and features in the embodiments can be combined with each other.

FIG. 4 is a schematic flowchart of a database operation method according to an embodiment of the present application. The method of the embodiment can be applied to a computer device where a database engine 11 is deployed, and a writing thread corresponding to a writing operation runs on the computer device. As shown in FIG. 4, the method of the embodiment may include the following steps.

Step 41: a writing thread traverses from a root node of the multiway tree to search a target index record matching a search keyword of a writing operation, so as to find a target node where the target index record is located.

Step 42: if the writing operation needs to trigger a structure modification operation, the writing thread applies for adding, according to a locking rule, exclusive locks for memory pages corresponding to the target node and other nodes needing associated modification, so as to modify the target node and the other nodes accordingly after successfully adding the exclusive locks for the target node and the other nodes; where the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released, and a preset mark needs to be set for the memory page corresponding to the any node; and a lock held by itself needs to be released if any memory page for which adding an exclusive lock is applied has been set with the preset mark by another writing thread.

In order to avoid a deadlock, an optimistic reading-writing operation usually needs to hold shared locks of memory pages corresponding to all non-leaf nodes (referred to as non-leaf pages for short) on a traversing path, a locking range of a single operation is relatively large, and the more concurrent operations, the more intense the locking competition, and the competition will be more obvious in some key nodes (such as a root node, a non-leaf node).

In order to reduce the locking range, the locking range can be reduced as much as possible in the traversing process. Specifically, in the traversal process, at most two shared locks of memory pages can be held at the same time, because when going from one node to another node along a pointer, no other thread can change the pointer. Therefore, a shared lock of a memory page corresponding to a latter node is obtained first, and then a shared lock of a memory page corresponding to a previous node is released, which is conducive to reducing the competition of concurrent operations.

Based on this, in an embodiment, the method provided in the embodiment of the present application may further include: when it is necessary to traverse from any node to a latter node of the any node, the writing thread applies for adding a shared lock for a memory page corresponding to the latter node, and after successfully adding the shared lock for the memory page corresponding to the latter node, releases a shared lock of a memory page corresponding to the any node.

The writer thread traverses from a root node of the multiway tree to search a target index record matching a search keyword of a writing operation (hereinafter referred to as a target index record), and a node where the target index record is located can be recorded as a target node. In practical application, the writing thread can traverse from the root node of the multiway tree by calling a positioning function to search the target index record matching the search keyword of the writing operation.

In this case, the aforementioned improvement to the traversing process can be implemented in the positioning function, and the aforementioned locking function can be called in the positioning function, where the positioning function may be, for example, a btr_cur_search_to_nth_level function. An input of the positioning function may include a search keyword, a lock mode (latch_mode) and a layer (level).

Exemplarily, the lock mode may mainly include the following: BTR_SEARCH_LEAF, BTR_MODIFY_LEAF, BTR_MODIFY_TREE and BTR_CONT_MODIFY_TREE. BTR_SEARCH_LEAF: locates an index record on a leaf page and adds an S latch for the memory page, which can be used for a reading operation for the leaf node. BTR_MODIFY_LEAF: locates an index record on a leaf page, adds an X latch for the memory page, and prepares to modify the index record, which can be used for an optimistic writing operation for the leaf node. BTR_MODIFY_TREE: locates a specified layer, adds an X latch for the memory page where the target index record is located and the memory pages of its left and right neighbors, and prepares to modify the target index record and may occur a structure modification operation, which can be used for a pessimistic writing operation for the leaf node and the non-leaf node. BTR_CONT_MODIFY_TREE: locates an index record of a specified layer, and only adds X latch for the memory page where the target index record is located, which can be used for an optimistic writing operation for the non-leaf node.

The optimistic writing operation refers to a writing operation that does not need to modify the structure of the multiway tree, that is, a writing operation that does not need to trigger the structure modification operation. The pessimistic writing operation refers to a writing operation that needs to modify the structure of the multiway tree, that is, a writing operation that needs to trigger the structure modification operation. According to different types of the writing operation, the pessimistic writing operation can include a pessimistic inserting operations and a pessimistic deleting operation.

Exemplarily, when a writing operation corresponding to a writing thread is an inserting operation, the writing thread can first locate a target node by using the BTR_MODIFY_LEAF mode, and hold an exclusive lock of a memory page corresponding to the target node, and if it is found that the capacity of the memory page corresponding to the target node is not large enough to accommodate the index record that needs to be inserted in the inserting operation, the pessimistic inserting can be triggered. After the pessimistic inserting is triggered, the writing thread can release the exclusive lock of the memory page corresponding to the target node, relocate in the BTR_MODIFY_TREE mode, hold the exclusive locks of the memory pages corresponding to the target node and its neighbor nodes, and then enter a pessimistic inserting process.

Exemplarily, when a writing operation corresponding to a writing thread is a deleting operation, the writing thread can first locate a target node by using the BTR_MODIFY_LEAF mode, and hold an exclusive lock of a memory page corresponding to the target node, and if it is found that the remaining space in the memory page is too large after deleting the index item that needs to be deleted in the deleting operation in the memory page corresponding to the target node, the pessimistic deleting can be triggered. After the pessimistic deleting is triggered, the writing thread can release the exclusive lock of the memory page corresponding to the target node, relocate in the BTR_MODIFY_TREE mode, hold the exclusive locks of the memory pages corresponding to the target node and its neighbor nodes, and then enter a pessimistic deleting process.

It should be understood that before entering the pessimistic inserting process and the pessimistic deleting process, the writing thread holds exclusive locks of memory pages corresponding to the target node and its neighbor nodes by a way of applying for adding the exclusive locks of the memory pages corresponding to the target node and its neighbor nodes by using the unconventional mode.

In the embodiment of the present application, if the writing operation needs to trigger the structure modification operation, the writing thread can apply for adding exclusive locks for memory pages corresponding to the target node and other nodes needing associated modification according to the locking rule, so as to modify the target node and the other nodes accordingly after successfully adding the exclusive locks for the target node and the other nodes. The other nodes needing associated modification may include one or more of a neighbor node on the right side of the target node, a neighbor node on the left side of the target node and the father node of the target node. The specific content about the locking rule can refer to the foregoing description, which will not be repeated here.

Exemplarily, for the pessimistic inserting operation, the writing thread can first determine a split point and a split order by a way of calling a split function, an input of the split function may include a page number, and an output of the split function may include the split point and the split order. The split point can be used to describe a split position of an index record in the target node, which corresponds to one index record in the target node; the splitting order can be used to describe whether to add a node on the right side of the target node or on the left side of the target node, and the former can be called right split and the latter can be called left split. The split function may be, for example, the btr_page_split_and_insert function. It should be noted that for an implementation form of determining the split point and the split order, the specific description in the related art can be referred to, and will not be repeated here.

In an embodiment, in a case that the splitting order is right split, step 42 may specifically include the following steps A1-A3.

Step A1, the writing thread applies for adding exclusive locks for memory pages corresponding to the target node and its neighbor node on the right side, and applies for a new memory page as a new node, and the writing thread holds an exclusive lock of the new memory page.

If the memory page corresponding to the target node has been set with a preset mark by another writing thread, the writing thread releases the lock it holds. Exemplarily, the writing thread can release all locks it holds. Further, the method provided in the embodiment may further include: if the memory page corresponding to the target node has been set with a preset mark by another writing thread to trigger the writing thread to release the lock it holds, the writing thread can wait for the preset mark of the memory page corresponding to the target node to be cleared, and then retraverse from the root node to search the target index record. Exemplarily, the writing thread can apply for adding an exclusive lock for the memory page corresponding to the target node by using the conventional mode, and after successfully adding the exclusive lock for the target node, retraverse from the root node of the multiway tree to search the target index record. For example, the BTR_MODI-FY_TREE mode can be reused to call the btr_cur_search_to_nth_level function.

If the memory page corresponding to the neighbor node on the right side has been set with a preset mark by another writing thread, the writing thread releases the lock it holds. Further, the method provided in the embodiment may further include: if the memory page corresponding to the neighbor node on the right side of the target node has been set with the preset mark by another writing thread to trigger the writing thread to release the lock it holds, the writing thread can wait for the preset mark of the memory page corresponding to the neighbor node to be cleared, and then retraverse from the root node to search the target index record.

The writing thread can execute step A2 after successfully adding the exclusive locks for the memory pages corresponding to the target node and its neighbor node on the right side.

Step A2, the writing thread moves a part of index records in the target node to the new node, and inserts an index record needed to be inserted in the inserting operation into the new node, and inserts the new node between the target node and the neighbor node by modifying index records in the target node, the new node and the neighbor node.

The part of the index records moved from the target node to the new node are determined according to the split point, and the part of the index records may or may not include an index record corresponding to the split point.

Step A3, the writing thread sets the preset mark for memory pages corresponding to the target node, the new node and the neighbor node first, releases exclusive locks of the memory pages corresponding to the target node, the new node and the neighbor node, and then applies for adding an exclusive lock for the memory page corresponding to the father node of the target node by using the unconventional mode, and after successfully adding the exclusive lock for the memory page corresponding to the father node, the writing thread adds the new node under the father node by adding in the father node an index record corresponding to the new node.

If the memory page corresponding to the father node of the target node has been set with a preset mark by another writing thread, the writing thread releases the lock it holds. Further, the method provided in the embodiment may further include: if the memory page corresponding to the father node of the target node has been set with a preset mark by another writing thread to trigger the writing thread to release the lock it holds, the writing thread can wait for the preset mark of the memory page corresponding to the father node to be cleared, and then retraverse from the root node to search the target index record.

Figure 5B:
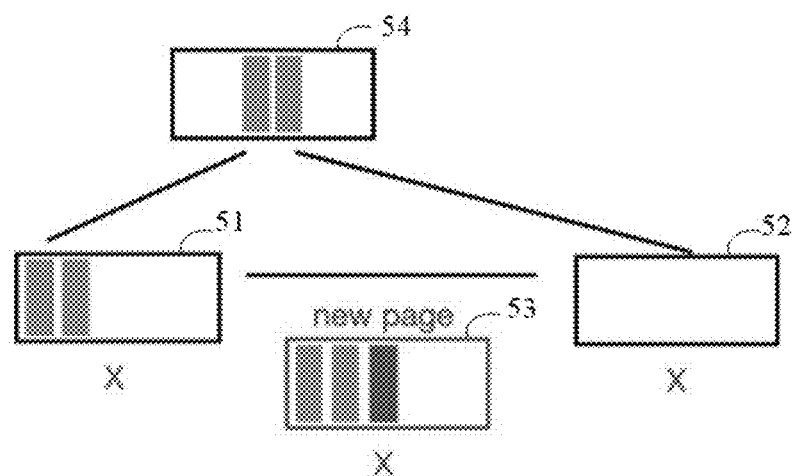
Figure 5C:
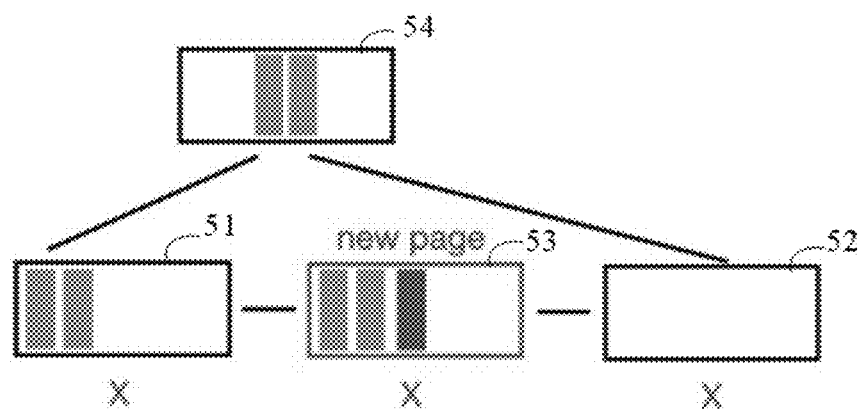
Figure 5D:
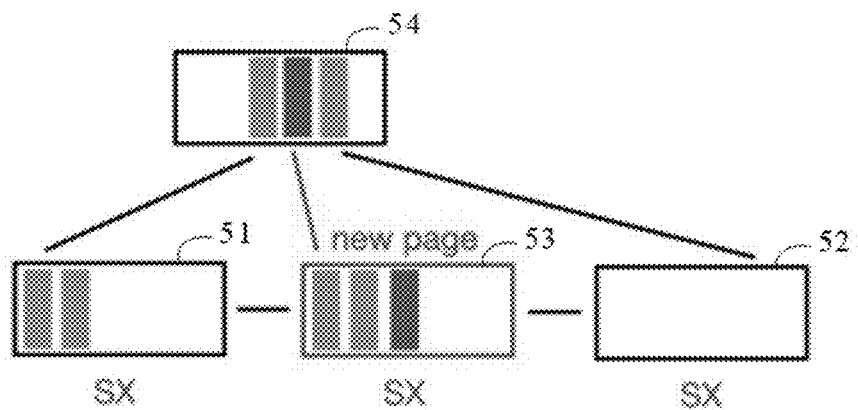

Exemplarily, first, as shown in FIG. 5A, the writing thread can hold exclusive locks X of the memory pages corresponding to the target node 51 and its neighbor node 52 on the right side. Then, as shown in FIG. 5B, the writing thread can apply for a new memory page (new page) as the new node 53, hold an exclusive lock X of the new memory page, move a part of index records in the target node 51 to the new node 53, and insert an index record needed to be inserted in the inserting operation into the new node 53. After then, as shown in FIG. 5C, the writing thread can insert the new node 53 between the target node 51 and the neighbor node 52 by modifying index records in the target node 51, the new node 53 and the neighbor node 52 (in the case that nodes of each layer are strung together through a bidirectional linked list). After then, as shown in FIG. 5D, the writing thread can release the exclusive locks of the memory pages corresponding to the target node 51, the neighbor node 52 and the new node 53 and at the same time add read-write locks SX for the memory pages corresponding to the target node 51, the neighbor node 52 and the new node 53, and then apply for adding an exclusive lock X for the memory page corresponding to the father node 54 of the target node by using the unconventional mode, and after successfully adding the exclusive lock for the memory page corresponding to the father node 54, insert the new node 53 under the father node 54 by adding in the father node 54 an index record corresponding to the new node 53.

It should be noted that in FIGS. 5A to 5D, a big rectangular box represents a node, a small rectangular box represents an index record in a node, and a small dark gray rectangular box represents an added index record, and for convenience of understanding, a lock type of a memory page corresponding to a node is marked near the node.

In another embodiment, in a case that the splitting order is left split, step 42 may specifically include the following steps B1-B5.

Step B1, the writing thread applies for adding exclusive locks for the memory pages corresponding to the target node and its neighbor node on the left side, and applies for a new memory page as a new node, and the writing thread holds an exclusive lock of the new memory page.

If the memory page corresponding to the target node has been set with a preset mark by another writing thread, the writing thread releases the lock it holds. Further, the method provided in the embodiment may further include: if the memory page corresponding to the target node has been set with a preset mark by another writing thread to trigger the writing thread to release the lock it holds, the writing thread can wait for the preset mark of the memory page corresponding to the target node to be cleared, and then retraverse from the root node to search the target index record.

If the memory page corresponding to the neighbor node on the left side has been set with a preset mark by another writing thread, the writing thread releases the lock it holds. Further, the method provided in the embodiment may further include: if the memory page corresponding to the neighbor node on the left side of the target node has been set with a preset mark by another writing thread to trigger the writing thread to release the lock it holds, the writing thread can wait for the preset mark of the memory page corresponding to the neighbor node to be cleared, and then retraverse from the root node to search the target index record.

The writing thread can execute step B2 after successfully adding the exclusive locks for the memory pages corresponding to the target node and its neighbor node on the left side.

Step B2, the writing thread sets the preset mark for memory pages corresponding to the target node and the neighbor node first, and releases the exclusive locks of the memory pages corresponding to the target node and the neighbor node, and then applies for adding an exclusive lock for the memory page corresponding to the father node of the target node by using the unconventional mode, and after successfully adding the exclusive lock for the memory page corresponding to the father node, adds the new node under the father node by modifying an index record in the father node originally pointing to the target node to point to the new node.

If the memory page corresponding to the father node of the target node has been set with a preset mark by another writing thread, the writing thread releases the lock it holds. Further, the method provided in the embodiment may further include: if the memory page corresponding to the father node of the target node has been set with a preset mark by another writing thread to trigger the writing thread to release the lock it holds, the writing thread can wait for the preset mark of the memory page corresponding to the father node to be cleared, and then retraverse from the root node to search the target index record.

Step B3, the writing thread applies for adding exclusive locks for the memory pages corresponding to the target node and the neighbor node by using the unconventional mode, moves a part of the index records in the target node to the new node after successfully adding the exclusive locks for the memory pages corresponding to the target node and the neighbor node, inserts an index record needed to be inserted in the inserting operation into the new node, and inserts the new node between the target node and the neighbor node by modifying index records in the target node, the new node and the neighbor node.

If the memory page corresponding to the target node (or the neighbor node) has been set with a preset mark by another writing thread, the writing thread releases the lock it holds. Further, the method provided in the embodiment may further include: if the memory page corresponding to the target node (or the neighbor node) has been set with a preset mark by another writing thread to trigger the writing thread to release the lock it holds, the writing thread can wait for the preset mark of the memory page corresponding to the target node (or the neighbor node) to be cleared, and then retraverse from the root node to search the target index record.

The part of index records moved from the target node to the new node are determined according to the split point, and the part of index records may or may not include an index record corresponding to the split point.

Step B4, the writing thread inserts the target node under the father node by adding in the father node an index record corresponding to the target node.

In an implementation, although the order (i.e. from top to down) from the father node to its child nodes (i.e. the target node and the neighbor node) meets the requirement of the locking direction (i.e. from top to down), in order to release the exclusive lock of the father node as early as possible and improve the concurrency performance, before the writing thread applies for adding exclusive locks for the memory pages corresponding to the target node and the neighbor node by using the unconventional mode, the method may further include: the writing thread sets the preset mark for the memory page corresponding to the father node, and releases the exclusive lock of the memory page corresponding to the father node.

Correspondingly, before step B4, the method may further include: the writing thread sets the preset mark for the memory pages corresponding to the target node, the new node and the neighbor node, and releases exclusive locks of the memory pages corresponding to the target node, the new node and the neighbor node; the writing thread applies for adding an exclusive lock for the memory page corresponding to the father node of the target node by using the unconventional mode. After the exclusive lock is successfully added for the memory page corresponding to the father node, the writing thread adds the new node under the father node by modifying an index record in the father node originally pointing to the target node to point to the new node.

Figure 6A:
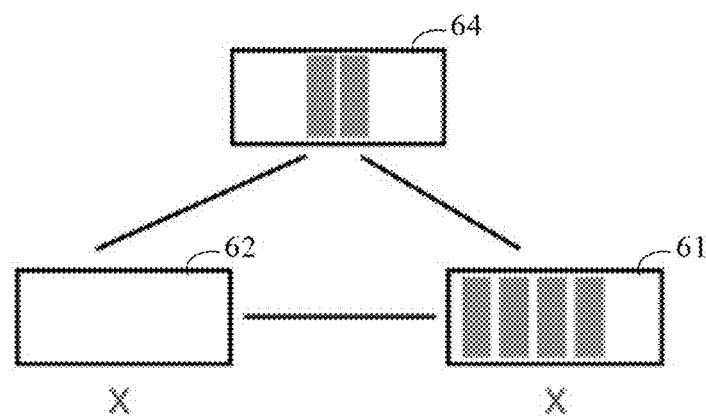
FIGS. 6A-6D are schematic diagrams of a processing process of an inserting operation according to another embodiment of the present application.
Figure 6B:
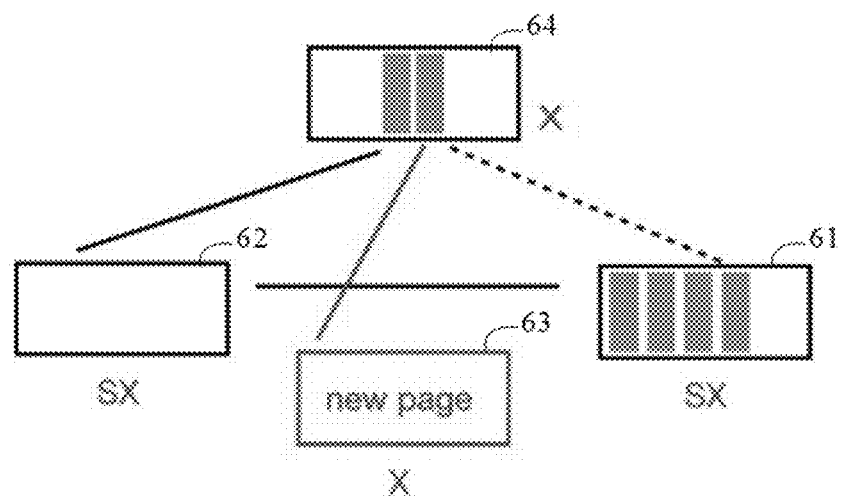
Figure 6C:
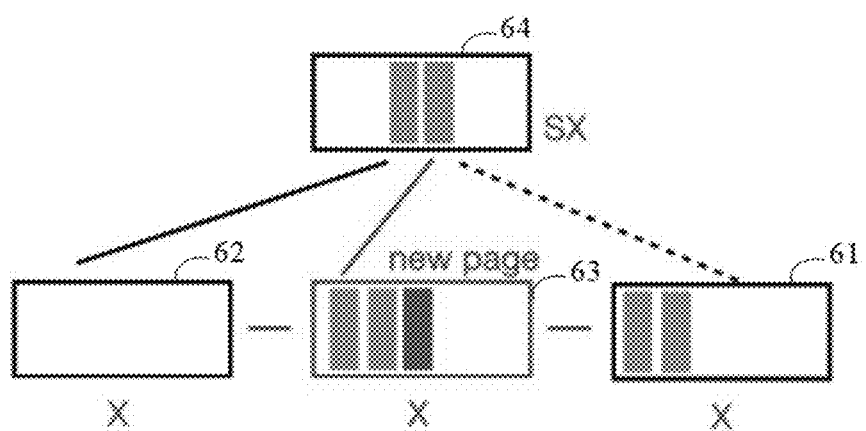
Figure 6D:
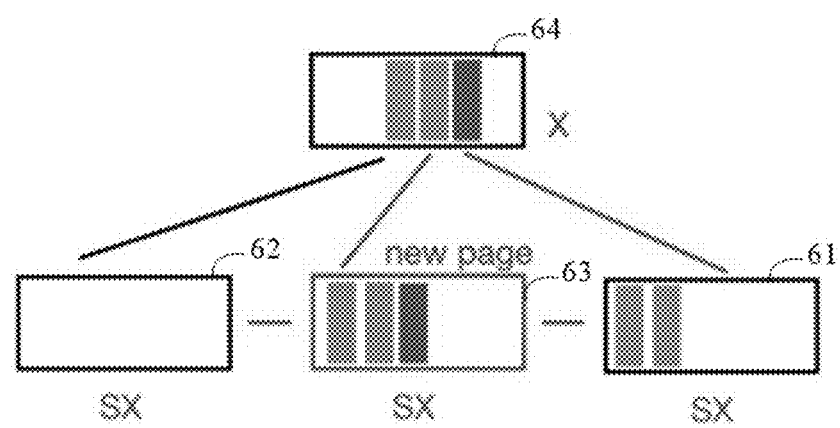

Exemplarily, first, as shown in FIG. 6A, the writing thread can hold exclusive locks X of memory pages corresponding to the target node 61 and its neighbor node 62 on the left side. Then, as shown in FIG. 6B, the writing thread can apply for a new memory page as the new node 63, and hold an exclusive lock X of the new memory page. The writing thread can first release the exclusive locks of the memory pages corresponding to the target node 61 and the neighbor node 62, and at the same time add read-write locks SX for the memory pages corresponding to the target node 61 and the neighbor node 62, and then apply for adding an exclusive lock X for the memory page corresponding to the father node 64 of the target node by using the unconventional mode, and after successfully adding the exclusive lock for the memory page corresponding to the father node 64, insert the new node 63 under the father node 64 by modifying an index record in the father node 64 originally pointing to the target node 61 to point to the new node 63. After then, as shown in FIG. 6C, the writing thread can first release the exclusive lock of the memory page corresponding to the father node 64, and at the same time add a read-write lock SX for the memory page corresponding to the father node 64, and then apply for adding exclusive locks X for the memory pages corresponding to the target node 61 and the neighbor node 62 by using the unconventional mode, and after successfully adding the exclusive locks for the memory pages corresponding to the target node 61 and the neighbor node 62, move a part of index records in the target node 61 to the new node 63, insert an index record needed to be inserted in the inserting operation into the new node 63, insert the new node 63 between the target node 61 and the neighbor node 62 by modifying index records in the target node 61, the new node 63 and the neighbor node 62 (in a case that nodes of each layer are strung together through a bidirectional linked list). After then, as shown in FIG. 6D, the writing thread can insert the target node 61 under the father node 64 by adding in the father node 64 an index record corresponding to the target node 61.

It should be noted that in FIGS. 6A to 6D, a big rectangular box represents a node, a small rectangular box represents an index record in a node, and a small dark gray rectangular box represents an added index record, and for convenience of understanding, a lock type of a memory page corresponding to a node is marked near the node.

It should be noted that when a node that is splitting (i.e. the target node) is the root node, index records in the root node can be copied to a new node first, and the new node is used as a child node of the root node for performing splitting.

Exemplarily, for the pessimistic deleting operation, a structure modification operation triggered by the pessimistic deleting operation can be divided into discard and compress. The discard refers to deleting an empty node from the multiway tree; the compress is merging with another node (a neighbor node or a father node) by a node with index records.

For the discard, before the deleting, if there is only one index record in the target node, the target node will be deleted directly when occurring a deleting operation. In an embodiment, in a case that the target node needs to be deleted, step 42 could specifically include the following steps C1-C3.

Step C1: The writing thread applies for adding exclusive locks for memory pages corresponding to the target node and its neighbor node.

If the memory page corresponding to the target node has been set with a preset mark by another writing thread, the writing thread releases the lock it holds. Further, the method provided in the embodiment may further include: if the memory page corresponding to the target node has been set with a preset mark by another writing thread to trigger the writing thread to release the lock it holds, the writing thread can wait for the preset mark of the memory page corresponding to the target node to be cleared, and then retraverse from the root node to search the target index record.

If the memory page corresponding to the neighbor node has been set with a preset mark by another writing thread, the writing thread releases the lock it holds. Further, the method provided in the embodiment may further include: if the memory page corresponding to the neighbor node of the target node has been set with a preset mark by another writing thread to trigger the writing thread to release the lock it holds, the writing thread can wait for the preset mark of the memory page corresponding to the neighbor node to be cleared, and then retraverse from the root node to search the target index record.

The writing thread can execute step C2 after successfully adding the exclusive locks for the memory pages corresponding to the target node and its neighbor node.

Step C2, the writing thread sets the preset mark for the memory pages corresponding to the target node and the neighbor node first, and releases the exclusive locks of the memory pages corresponding to the target node and the neighbor node, and then applies for adding an exclusive lock for the memory page corresponding to the father node of the target node by using the unconventional mode, and after successfully adding the exclusive lock for the memory page corresponding to the father node, the writing thread deletes the target node from under the father node by deleting in the father node an index record corresponding to the target node.

If the memory page corresponding to the father node of the target node has been set with a preset mark by another writing thread, the writing thread releases the lock it holds. Further, the method provided in the embodiment may further include: if the memory page corresponding to the father node of the target node has been set with a preset mark by another writing thread to trigger the writing thread to release the lock it holds, the writing thread can wait for the preset mark of the memory page corresponding to the father node to be cleared, and then retraverse from the root node to search the target index record.

Step C3, the writing thread applies for adding exclusive locks for the memory pages corresponding to the target node and its neighbor node, deletes the target node from the multiway tree by modifying index records in the neighbor node after successfully adding an exclusive lock for the memory page corresponding to the neighbor node, and releases the memory page corresponding to the target node after successfully adding an exclusive lock for the target node.

If the memory page corresponding to the target node (or the neighbor node) has been set with a preset mark by another writing thread, the writing thread releases the lock it holds. Further, the method provided in the embodiment may further include: if the memory page corresponding to the target node (or the neighbor node) has been set with a preset mark by another writing thread to trigger the writing thread to release the lock it holds, the writing thread can wait for the preset mark of the memory page corresponding to the target node (or the neighbor node) to be cleared, and then retraverse from the root node to search the target index record.

In an implementation, although the order (i.e. from top to down) from the father node to its child nodes (i.e. the target node and the neighbor node) meets the requirement of the locking direction (i.e. from top to down), in order to release the exclusive lock of the father node as early as possible and improve the concurrency performance, before the writing thread applies for adding exclusive locks for the memory pages corresponding to the target node and the neighbor node by using the unconventional mode, the method may further include: the writing thread sets the preset mark for the memory page corresponding to the father node, and releases the exclusive lock of the memory page corresponding to the father node.

Figure 7A:
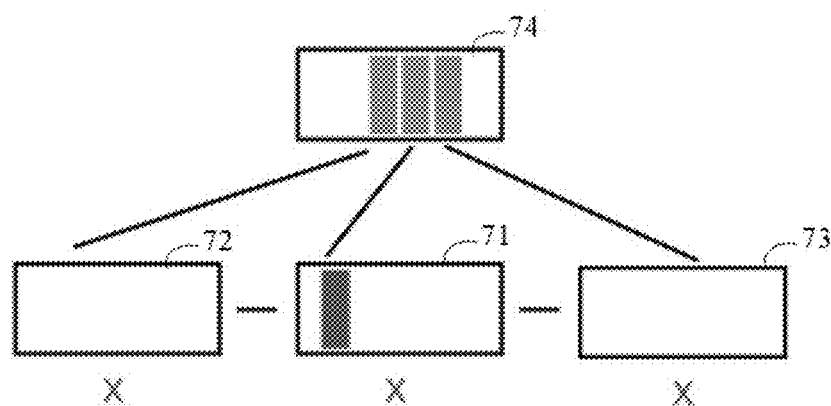
FIGS. 7A-7D are schematic diagrams of a processing process of a deleting operation according to an embodiment of the present application.
Figure 7B:
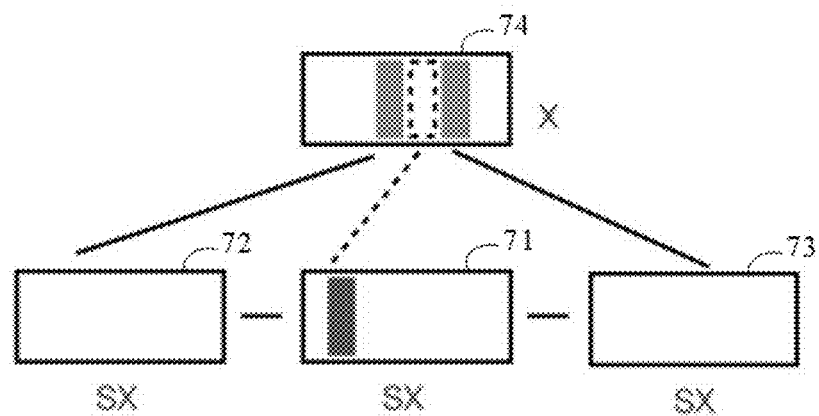
Figure 7C:
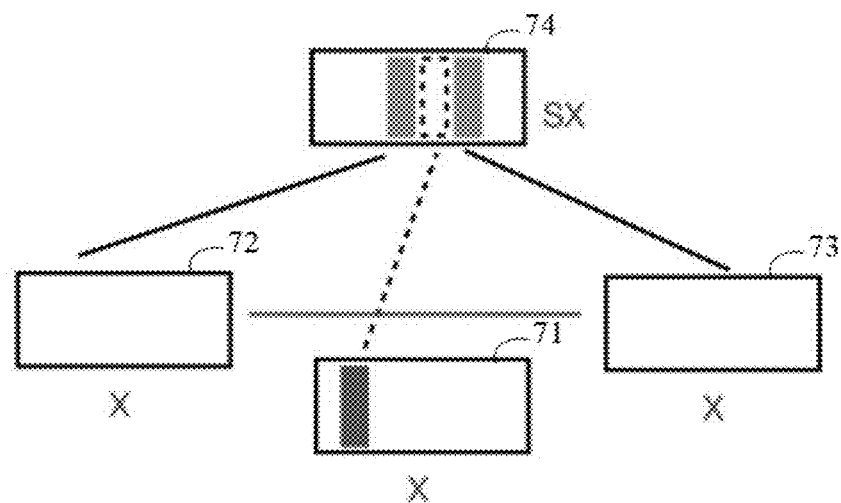
Figure 7D:
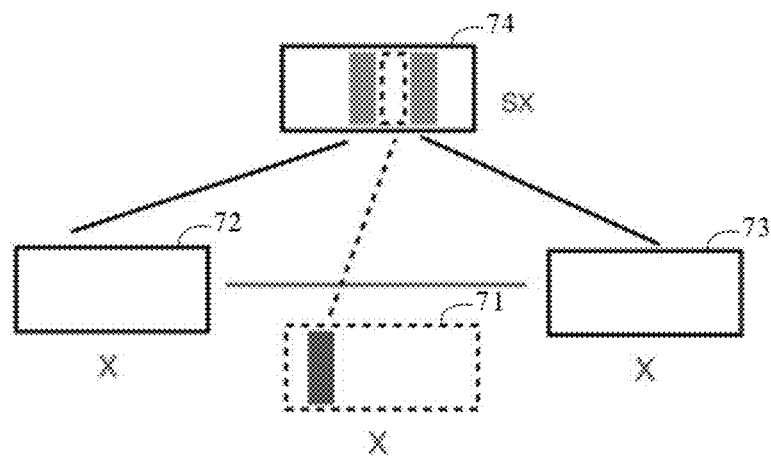

Exemplarily, first, as shown in FIG. 7A, the writing thread can hold exclusive locks X of the memory pages corresponding to the target node 71 and its neighbor node 72 on the left side and the neighbor node 73 on the right side. Then, as shown in FIG. 7B, the writing thread can first release the exclusive locks of the memory pages corresponding to the target node 71, the neighbor node 72 and the neighbor node 73, and at the same time add read-write locks SX for the memory pages corresponding to the target node 71, the neighbor node 72 and the neighbor node 73, and then apply for adding an exclusive lock X for the memory page corresponding to the father node 74 of the target node by using the unconventional mode, and after successfully adding the exclusive lock for the memory page corresponding to the father node 74, delete the target node 71 from under the father node 74 by deleting in the father node 74 an index record corresponding to the target node 71. After then, as shown in FIG. 7C, the writing thread can first release the exclusive lock of the memory page corresponding to the father node 74, and at the same time add a read-write lock SX for the memory page corresponding to the father node 74, and then apply for adding exclusive locks X for the memory pages corresponding to the target node 71, the neighbor node 72 and the neighbor node 73 by using the unconventional mode, and after successfully adding the exclusive locks for the memory pages corresponding to the neighbor node 72 and the neighbor node 73, delete the target node 71 from the multiway tree by modifying index records in the neighbor node 72 and the neighbor node 73 (in a case that nodes of each layer is strung together through a bidirectional linked list). After then, as shown in FIG. 7D, the writing thread can release the memory page corresponding to the target node 71 after successfully adding an exclusive lock for the target node 71.

It should be noted that in FIGS. 7A to 7D, a big rectangular box represents a node, a small rectangular box represents an index record in a node, and a small dark gray rectangular box represents an index record needed to be deleted in the deleting operation, and for convenience of understanding, a lock type of a memory page corresponding to a node is marked near the node.

For the compress, if there are still left index records in the target node after deleting, the target node needs to be merged with another node, which can be divided into merging with the father node or merging with the neighbor node. Merging with the father node can be called lift up, and merging with the neighbor node can be called merge.

Exemplarily, for the lift up, if it is found that there is only one node on the layer where the target node is located, the target node needs to be merged with the father node. It should be noted that if there is only one node on the layer where the father node of the target node is located, and there is only one index record in the father node of the target node, the father node of the target node may be merged with the father node of the father node of the target node, and finally it can be merged into the root node of the multiway tree according to this merging method. Exemplarily, suppose that the target node is node a, the father node of the target node is node b, and the father node of the father node of the target node is node c, before applying for adding an exclusive lock for the memory page corresponding to node b, a preset mark can be set for node a first, and the exclusive lock of the memory page corresponding to node a can be released; before applying for adding an exclusive lock for the memory page corresponding to node c, a preset mark can be set for node b first, and the exclusive lock of the memory page corresponding to node b can be released.

Exemplarily, for the merge, it may be checked whether a neighbor node can accommodate remaining index records in the target node. It is possible to try to merge with the neighbor node on the left side, and if it fails, try to merge with the neighbor node on the right side. Merging with the neighbor node on the right side can be called right merge, and merging with the neighbor node on the left side can be called left merge.

In an embodiment, in a case that the remaining index records in the target node need to be merged to the neighbor node on the left side of the target node, step 42 may specifically include the following steps D1-D4.

Step D1, the writing thread applies for adding exclusive locks for memory pages corresponding to the target node and its neighbor node.

If the memory page corresponding to the target node has been set with a preset mark by another writing thread, the writing thread releases the lock it holds. Further, the method provided in the embodiment may further include: if the memory page corresponding to the target node has been set with a preset mark by another writing thread to trigger the writing thread to release the lock it holds, the writing thread can wait for the preset mark of the memory page corresponding to the target node to be cleared, and then retraverse from the root node to search the target index record.

If the memory page corresponding to the neighbor node has been set with a preset mark by another writing thread, the writing thread releases the lock it holds. Further, the method provided in the embodiment may further include: if the memory page corresponding to the neighbor node of the target node has been set with a preset mark by another writing thread to trigger the writing thread to release the lock it holds, the writing thread can wait for the preset mark of the memory page corresponding to the neighbor node to be cleared, and then retraverse from the root node to search the target index record.

The writing thread can execute step D2 after successfully adding an exclusive lock of the memory page corresponding to the target node.

The writing thread can execute step D3 after successfully adding the exclusive locks of the memory pages corresponding to the target node and its neighbor node.

Step D2, after successfully adding the exclusive lock for the memory page corresponding to the target node, the writing thread deletes the target index record in the target node.

Step D3, the writing thread sets the preset mark for the memory pages corresponding to the target node and the neighbor node first, and releases the exclusive locks of the memory pages corresponding to the target node and the neighbor node, and then applies for adding an exclusive lock for the memory page corresponding to the father node of the target node by using the unconventional mode, and after successfully adding the exclusive lock for the memory page corresponding to the father node, the writing thread deletes the target node from under the father node by deleting in the father node an index record corresponding to the target node.

If the memory page corresponding to the father node of the target node has been set with a preset mark by another writing thread, the writing thread releases the lock it holds. Further, the method provided in the embodiment may further include: if the memory page corresponding to the father node of the target node has been set with a preset mark by another writing thread to trigger the writing thread to release the lock it holds, the writing thread can wait for the preset mark of the memory page corresponding to the father node to be cleared, and then retraverse from the root node to search the target index record.

Step D4, the writing thread applies for adding exclusive locks for the memory pages corresponding to the target node and its neighbor node, and after successfully adding the exclusive locks for the memory pages corresponding to the target node and its neighbor node, moves remaining index records in the target node into the neighbor node on the left side of the target node, deletes the target node from the multiway tree by modifying index records in the neighbor node of the target node, and releases the memory page corresponding to the target node.

If the memory page corresponding to the target node (or the neighbor node) has been set with a preset mark by another writing thread, the writing thread releases the lock it holds. Further, the method provided in the embodiment may further include: if the memory page corresponding to the target node (or the neighbor node) has been set with a preset mark by another writing thread to trigger the writing thread to release the lock it holds, the writing thread can wait for the preset mark of the memory page corresponding to the target node (or the neighbor node) to be cleared, and then retraverse from the root node to search the target index record.

In an implementation, although the order (i.e. from top to down) from the father node to its child nodes (i.e. the target node and the neighbor node) meets the requirement of the locking direction (i.e. from top to down), in order to release the exclusive lock of the father node as early as possible and improve the concurrency performance, before the writing thread applies for adding exclusive locks for the memory pages corresponding to the target node and the neighbor node by using the unconventional mode, the method may further include: the writing thread sets the preset mark for the memory page corresponding to the father node, and releases the exclusive lock of the memory page corresponding to the father node.

Figure 8A:
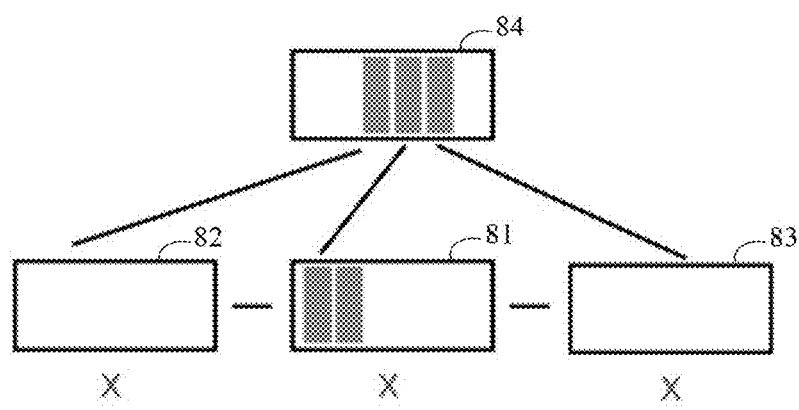
FIGS. 8A-8D are schematic diagrams of a processing process of a deleting operation according to another embodiment of the present application.
Figure 8B:
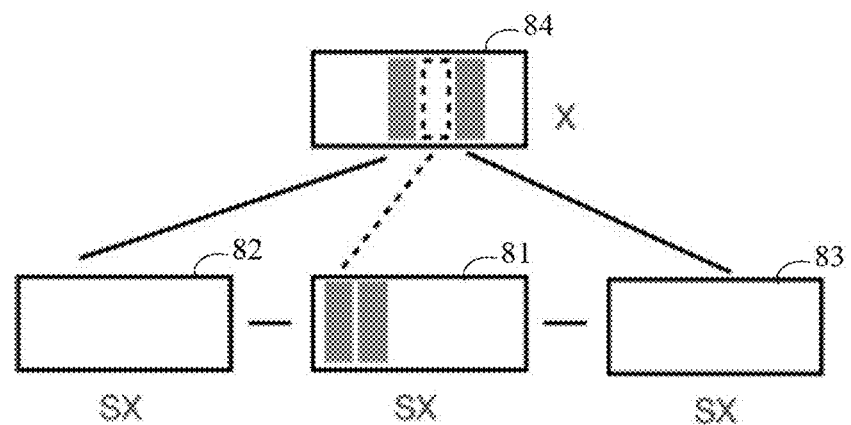
Figure 8C:
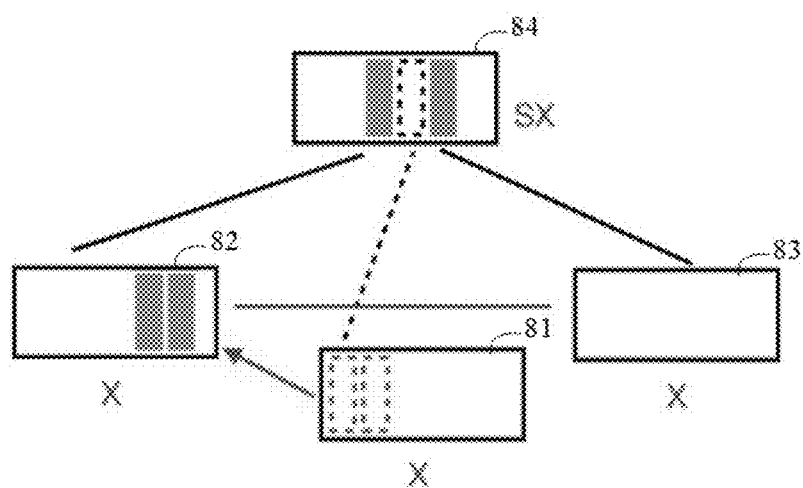
Figure 8D:
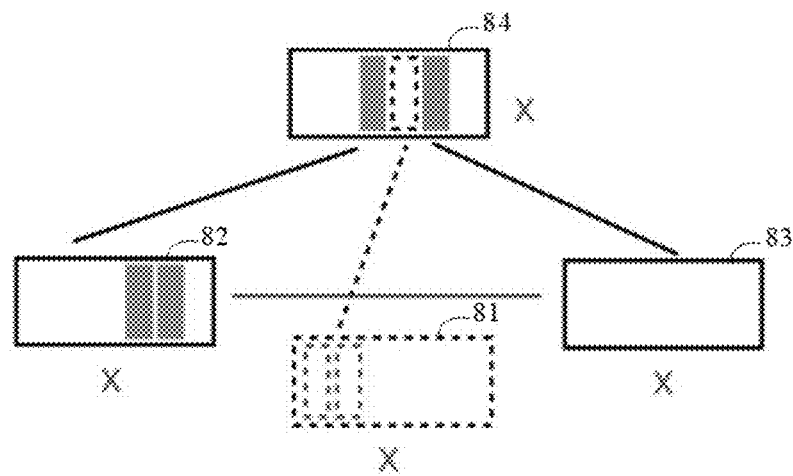

Exemplarily, first, as shown in FIG. 8A, the writing thread can hold exclusive locks X of memory pages corresponding to the target node 81 and its neighbor node 82 on the left side and the neighbor node 83 on the right side. Then, as shown in FIG. 8B, the writing thread can first release exclusive locks of the memory pages corresponding to the target node 81, the neighbor node 82 and the neighbor node 83, and at the same time add read-write locks SX for the memory pages corresponding to the target node 81, the neighbor node 82 and the neighbor node 83, and then apply for adding an exclusive lock X for the memory page corresponding to the father node 84 of the target node by using the unconventional mode, and after successfully adding the exclusive lock for the memory page corresponding to the father node 84, delete the target node 81 from under the father node 84 by deleting in the father node 84 an index record corresponding to the target node 81. After then, as shown in FIG. 8C, the writing thread can first release the exclusive lock of the memory page corresponding to the father node 84, and at the same time add a read-write lock SX for the memory page corresponding to the father node 84, and then apply for adding exclusive locks X for the memory pages corresponding to the target node 81, the neighbor node 82 and the neighbor node 83 by using the unconventional mode, and after successfully adding the exclusive locks for the memory pages corresponding to the target node 81, the neighbor node 82 and the neighbor node 83, move the remaining index records in the target node 81 to the neighbor node 82, and delete the target node 81 from the multiway tree by modifying index records in the neighbor node 82 and the neighbor node 83 (in a case that nodes of each layer are strung together through a bidirectional linked list). After then, as shown in FIG. 8D, the writing thread can release the memory page corresponding to the target node 81.

It should be noted that in FIGS. 8A to 8D, a big rectangular box represents a node, a small rectangular box represents an index record in a node, and for convenience of understanding, a lock type of a memory page corresponding to a node is marked near the node.

In another embodiment, in a case that the remaining index records in the target node need to be merged to the neighbor node on the right side of the target node, step 42 may specifically include the following steps E1-E4.

Step E1, the writing thread applies for adding exclusive locks for the memory pages corresponding to the target node and its neighbor node.

If the memory page corresponding to the target node has been set with a preset mark by another writing thread, the writing thread releases the lock it holds. Further, the method provided in the embodiment may further include: if the memory page corresponding to the target node has been set with a preset mark by another writing thread to trigger the writing thread to release the lock it holds, the writing thread can wait for the preset mark of the memory page corresponding to the target node to be cleared, and then retraverse from the root node to search the target index record.

If the memory page corresponding to the neighbor node has been set with a preset mark by another writing thread, the writing thread releases the lock it holds. Further, the method provided in the embodiment may further include: if the memory page corresponding to the neighbor node of the target node has been set with a preset mark by another writing thread to trigger the writing thread to release the lock it holds, the writing thread can wait for the preset mark of the memory page corresponding to the neighbor node to be cleared, and then retraverse from the root node to search the target index record.

The writing thread can execute step E2 after successfully adding an exclusive lock for the memory page corresponding to the target node.

The writing thread can execute step E3 after successfully adding exclusive locks for the memory pages corresponding to the target node and its neighbor node.

Step E2, the writing thread deletes the target index record in the target node.

Step E3, the writing thread sets the preset mark for memory pages corresponding to the target node and the neighbor node first, and releases the exclusive locks of the memory pages corresponding to the target node and the neighbor node, and then applies for adding an exclusive lock for the memory page corresponding to the father node of the target node, and after successfully adding the exclusive lock for the memory page corresponding to the father node, deletes the neighbor node on the right side of the target node from under the father node by deleting in the father node an index record corresponding to the neighbor node on the right side of the target node, and inserts the neighbor node on the right side of the target node under the father node by modifying an index record in the father node originally pointing to the target node to point to the neighbor node on the right side of the target node.

If the memory page corresponding to the father node of the target node has been set with a preset mark by another writing thread, the writing thread releases the lock it holds. Further, the method provided in the embodiment may further include: if the memory page corresponding to the father node of the target node has been set with a preset mark by another writing thread to trigger the writing thread to release the lock it holds, the writing thread can wait for the preset mark of the memory page corresponding to the father node to be cleared, and then retraverse from the root node to search the target index record.

Step E4, the writing thread applies for adding exclusive locks for the memory pages corresponding to the target node and its neighbor node, and after successfully adding the exclusive locks for the memory pages corresponding to the target node and its neighbor node, moves the remaining index records in the target node into the neighbor node on the right side of the target node, deletes the target node from the multiway tree by modifying an index record in the neighbor node of the target node, and releases the memory page corresponding to the target node.

If the memory page corresponding to the target node (or the neighbor node) has been set with a preset mark by another writing thread, the writing thread releases the lock it holds. Further, the method provided in the embodiment may further include: if the memory page corresponding to the target node (or the neighbor node) has been set with a preset mark by another writing thread to trigger the writing thread to release the lock it holds, the writing thread can wait for the preset mark of the memory page corresponding to the target node (or the neighbor node) to be cleared, and then retraverse from the root node to search the target index record.

In an implementation, although the order (i.e. from top to down) from the father node to its child nodes (i.e. the target node and the neighbor node) meets the requirement of the locking direction (i.e. from top to down), in order to release the exclusive lock of the father node as early as possible and improve the concurrency performance, before the writing thread applies for adding exclusive locks for the memory pages corresponding to the target node and the neighbor node by using the unconventional mode, the method may further include: the writing thread sets the preset mark for the memory page corresponding to the father node, and releases the exclusive lock of the memory page corresponding to the father node.

Figure 9A:
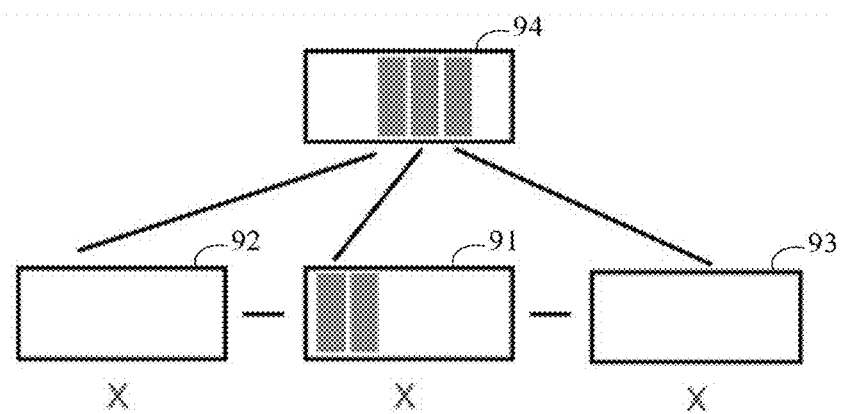
FIGS. 9A-9D are schematic diagrams of a processing process of a deleting operation according to yet another embodiment of the present application.
Figure 9B:
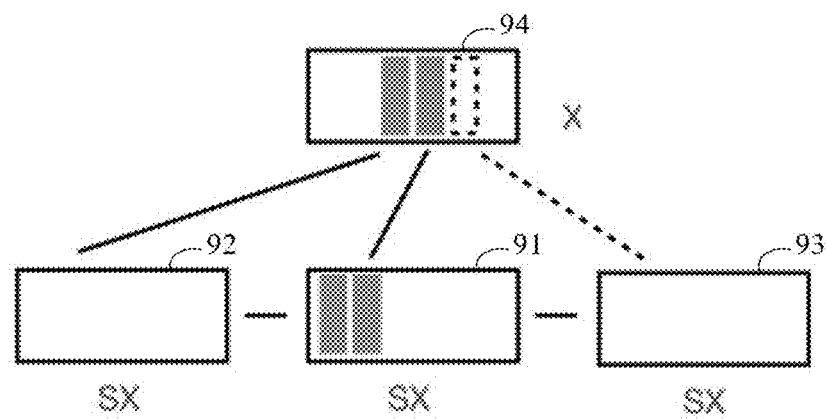
Figure 9C:
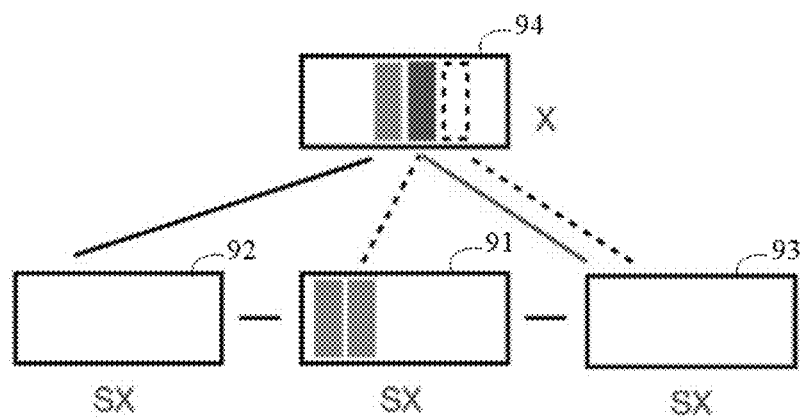
Figure 9D:
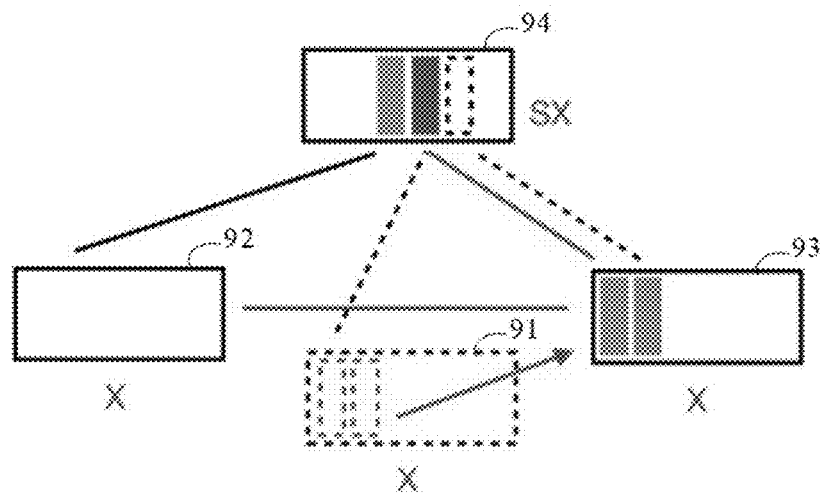

Exemplarily, first, as shown in FIG. 9A, the writing thread can hold exclusive locks X of memory pages corresponding to the target node 91 and its neighbor node 92 on the left side and the neighbor node 93 on the right side. Then, as shown in FIG. 9B, the writing thread can first release the exclusive locks of the memory pages corresponding to the target node 91, the neighbor node 92 and the neighbor node 93, and at the same time add read-write locks SX for the memory pages corresponding to the target node 91, the neighbor node 92 and the neighbor node 93, and then apply for adding an exclusive lock X for the memory page corresponding to the father node 94 of the target node by using the unconventional mode, and after successfully adding the exclusive lock for the memory page corresponding to the father node 94, delete the neighbor node 93 from under the father node 94 by deleting in the father node 94 an index record corresponding to the neighbor node 93. After then, as shown in FIG. 9C, the writing thread can insert the neighbor node 93 under the father node 94 by modifying an index record in the father node 94 originally pointing to the target node 91 to point to the neighbor node 93. After then, as shown in FIG. 9D, the writing thread can first release the exclusive lock of the memory page corresponding to the father node 94, and at the same time add a read-write lock SX for the memory page corresponding to the father node 94, and then apply for adding exclusive locks X for the memory pages corresponding to the target node 91, the neighbor node 92 and the neighbor node 93 by using the unconventional mode, and after successfully adding the exclusive locks for the memory pages corresponding to the target node 91, the neighbor node 92 and the neighbor node 93, move the remaining index records in the target node 91 to the neighbor node 93, delete the target node 91 from the multiway tree by modifying index records in the neighbor node 92 and the neighbor node 93 (in a case that nodes of each layer are strung together through a bidirectional linked list), and release the memory page corresponding to the target node 91.

It should be noted that in FIGS. 9A to 9D, a big rectangular box represents a node, a small rectangular box represents an index record in a node, and a small dark gray rectangular box represents a modified index record, and for convenience of understanding, a lock type of a memory page corresponding to a node is marked near the node.

In the embodiment of the present application, a reading operation can be compatible with a preset mark, that is, there may be no conflict between the preset mark on the memory page and other threads acquiring a shared lock, so that the reading operation can continue to be executed. In an implementation, for a node in the middle state of SMO, the writing thread can set for the node a pointer pointing to its new neighbor node, so that when other reading operations access the node in the middle state of SMO, they can continue to search in its new neighbor node, thus solving the problem that the structure of the multiway tree is incomplete before the structure modification operation is completed. For example, in a process of right split, a pointer pointing to a new node (new node) can be set in an old node (old node), which is equivalent to being a foster parent of the new node, and a reading operation can traverse from the old node to the new node. In a case that nodes of each layer are strung together through a bidirectional linked list (level list), the left and right pointers of a node can be reused.

Based on this, in an embodiment, the method provided in the embodiment may further include: for any node with the preset mark set by itself, if a neighbor node of the any node needs to be changed, setting in the any node a pointer pointing to the new neighbor node of the any node. In this case, exemplarily, if the reading operation enters a memory page in the middle state of SMO, it can be decided whether to continue to search a neighbor node on its right side according to a result of comparing a search keyword with a maximum key of the index record of the memory page.

Similar to the writing thread, for the reading thread, when it is necessary to traverse from any node to a latter node of the any node, the reading thread can apply for adding a shared lock for a memory page corresponding to the latter node, and after successfully adding the shared lock for the memory page corresponding to the latter node, releases the shared lock of the memory page corresponding to the any node.

In the embodiment of the present application, a writing thread does not apply for adding a read-write lock for a whole multiway tree, but applies for adding exclusive locks for memory pages corresponding to a target node and other nodes needing associated modification according to a locking rule, so as to modify the target node and the other nodes accordingly after successfully adding the exclusive locks for the target node and the other nodes, and the target node refers to a found node where an index record matching a search keyword is located. It is realized that a single writing thread can modify the structure of the multiway tree by only adding exclusive locks for memory pages corresponding to nodes needing to be modified in the multiway tree, so that conflicts between multiple writing threads are at the page level, and so that structure modification operations for the same multiway tree can be concurrent. In addition, the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released and a preset mark needs to be set for the memory page corresponding to the any node; and a lock held by itself needs to be released if any memory page for which adding an exclusive lock is applied has been set with the preset mark by another writing thread, which allows to apply for locking according to the locking rule, and the problem of a deadlock between threads can be avoided.

Figure 10:
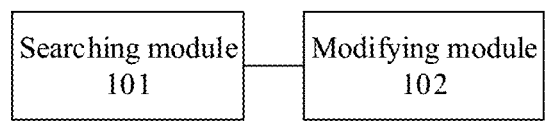
FIG. 10 is a schematic structural diagram of a database operation apparatus according to an embodiment of the present application.

FIG. 10 is a schematic structural diagram of a database operation apparatus according to an embodiment of the present application. Referring to FIG. 10, the embodiment provides a database operation apparatus, and the apparatus can perform the database operation method provided in the above method embodiment. Specifically, the apparatus may include:

a searching module 101, configured to traverse from a root node of the multiway tree to search a target index record matching a search keyword of a writing operation, so as to find a target node where the target index record is located; and a modifying module 102, configured to: if the writing operation needs to trigger a structure modification operation, apply for adding, according to a locking rule, exclusive locks for memory pages corresponding to the target node and other nodes needing associated modification, so as to modify the target node and the other nodes accordingly after successfully adding the exclusive locks for the target node and the other nodes; where the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released and a preset mark needs to be set for the memory page corresponding to the any node; and a lock held by itself needs to be released if any memory page for which adding an exclusive lock is applied has been set with the preset mark by another data operation apparatus.

In an implementation, the locking direction includes a top-to-down direction and a left-to-right direction along the multiway tree.

In an implementation, the exclusive lock of the memory page corresponding to the any node needing to be released and the preset mark needing to be set for the memory page corresponding to the any node includes: releasing the exclusive lock of the memory page corresponding to the any node and adding a read-write lock for the memory page corresponding to the any node needing to be done at the same time.

In an implementation, the writing operation is an inserting operation, and a node needs to be added on a right side of the target node; the modifying module 102 is specifically configured to:
- apply for adding exclusive locks for memory pages corresponding to the target node and its neighbor node on the right side, and apply for a new memory page as a new node, where the data operation apparatus holds an exclusive lock of the new memory page;
- after successfully adding the exclusive locks for the memory pages corresponding to the target node and its neighbor node on the right side, move a part of index records in the target node to the new node, insert an index record needed to be inserted in the inserting operation into the new node, and insert the new node between the target node and the neighbor node by modifying index records in the target node, the new node and the neighbor node; and
- set the preset mark for memory pages corresponding to the target node, the new node and the neighbor node first, release exclusive locks of the memory pages corresponding to the target node, the new node and the neighbor node, then apply for adding an exclusive lock for a memory page corresponding to a father node of the target node by using an unconventional mode, and after successfully adding the exclusive lock for the memory page corresponding to the father node, insert the new node under the father node by adding in the father node an index record corresponding to the new node.

In an implementation, the writing operation is an inserting operation, and a node needs to be added on a left side of the target node; the modifying module 102 is specifically configured to:
- apply for adding exclusive locks for memory pages corresponding to the target node and its neighbor node on the left side, and applying for a new memory page as a new node, where the data operation apparatus holds an exclusive lock of the new memory page;
- after successfully adding the exclusive locks for the memory pages corresponding to the target node and its neighbor node on the left side, set the preset mark for the memory pages corresponding to the target node and the neighbor node first, release the exclusive locks of the memory pages corresponding to the target node and the neighbor node, then apply for adding an exclusive lock for a memory page corresponding to a father node of the target node by using an unconventional mode, and after successfully adding the exclusive lock for the memory page corresponding to the father node, insert the new node under the father node by modifying an index record in the father node originally pointing to the target node to point to the new node; and
- after applying for adding the exclusive locks for the memory pages corresponding to the target node and the neighbor node by using the unconventional mode and successfully adding the exclusive locks for the memory pages corresponding to the target node and its neighbor node, move a part of index records in the target node to the new node, insert an index record needed to be inserted in the inserting operation into the new node, and insert the new node between the target node and the neighbor node by modifying index records in the target node, the new node and the neighbor node; and
- insert the target node under the father node by adding in the father node an index record corresponding to the target node.

In an implementation, the modifying module 102 is further configured to: set the preset mark for the memory page corresponding to the father node and release the exclusive lock of the memory page corresponding to the father node, before applying for adding the exclusive locks for the memory pages corresponding to the target node and the neighbor node by using the unconventional mode.

The modifying module 102 is further configured to: set the preset mark for the memory pages corresponding to the target node, the new node and the neighbor node, and release the exclusive locks of the memory pages corresponding to the target node, the new node and the neighbor node, before inserting the target node under the father node by adding in the father node an index record corresponding to the target node; where the data operation apparatus applies for adding an exclusive lock for the memory page corresponding to the father node of the target node by using the unconventional mode.

In an implementation, the writing operation is a deleting operation, and the target node needs to be deleted; the modifying module 102 is specifically configured to:
- apply for adding exclusive locks for memory pages corresponding to the target node and its neighbor node;
- after successfully adding the exclusive locks for the memory pages corresponding to the target node and its neighbor node, set the preset mark for the memory pages corresponding to the target node and the neighbor node first, release the exclusive locks of the memory pages corresponding to the target node and the neighbor node, then apply for adding an exclusive lock for a memory page corresponding to a father node of the target node by using the unconventional mode, and after successfully adding the exclusive lock for the memory page corresponding to the father node, delete the target node from under the father node by deleting in the father node an index record corresponding to the target node; and
- apply for adding exclusive locks for the memory pages corresponding to the target node and its neighbor node by using the unconventional mode, delete the target node from the multiway tree by modifying an index record in the neighbor node after successfully adding an exclusive lock for the memory page corresponding to the neighbor node, and release the memory page corresponding to the target node after successfully adding an exclusive lock for the target node.

In an implementation, the writing operation is a deleting operation, and remaining index records in the target node need to be merged to a neighbor node on a left side of the target node; the modifying module 102 is specifically configured to:
- apply for adding exclusive locks for the memory pages corresponding to the target node and its neighbor node;

after successfully adding an exclusive lock for the memory page corresponding to the target node, delete the target index record in the target node;

after successfully adding the exclusive locks for the memory pages corresponding to the target node and the neighbor node, set the preset mark for the memory pages corresponding to the target node and the neighbor node first, release the exclusive locks of the memory pages corresponding to the target node and the neighbor node, then apply for adding an exclusive lock for a memory page corresponding to a father node of the target node by using the unconventional mode, and after successfully adding the exclusive lock for the memory page corresponding to the father node, delete the target node from under the father node by deleting in the father node an index record corresponding to the target node; and apply for adding exclusive locks for the memory pages corresponding to the target node and its neighbor node by using the unconventional mode, and after successfully adding the exclusive locks for the memory pages corresponding to the target node and its neighbor node, move the remaining index records in the target node to the neighbor node on the left side of the target node, delete the target node from the multiway tree by modifying an index record in the neighbor node of the target node, and release the memory page corresponding to the target node.

In an implementation, the writing operation is a deleting operation, and remaining index records in the target node need to be merged to a neighbor node on a right side of the target node; the modifying module 102 is specifically configured to:

apply for adding exclusive locks for the memory pages corresponding to the target node and its neighbor node;

after successfully adding an exclusive lock for the memory page corresponding to the target node, delete the target index record in the target node;

after successfully adding the exclusive locks for the memory pages corresponding to the target node and the neighbor node, set the preset mark for the memory pages corresponding to the target node and the neighbor node first, release the exclusive locks of the memory pages corresponding to the target node and the neighbor node, then apply for adding an exclusive lock for a memory page corresponding to a father node of the target node, and after successfully adding the exclusive lock for the memory page corresponding to the father node, delete the neighbor node on the right side of the target node from under the father node by deleting in the father node an index record corresponding to the neighbor node on the right side of the target node, and insert the neighbor node on the right side of the target node under the father node by modifying an index record in the father node originally pointing to the target node to point to the neighbor node on the right side of the target node; and apply for adding exclusive locks for the memory pages corresponding to the target node and its neighbor node by using the unconventional mode, and after successfully adding the exclusive locks for the memory pages corresponding to the target node and the neighbor node, move the remaining index records in the target node to the neighbor node on the right side of the target node, delete the target node from the multiway tree by modifying an index record in the neighbor node of the target node, and release the memory page corresponding to the target node.

In an implementation, the modifying module 102 is further configured to: set the preset mark for the memory page corresponding to the father node, and release the exclusive lock of the memory page corresponding to the father node, before applying for adding the exclusive locks for the memory pages corresponding to the target node and its neighbor node by using the unconventional mode.

In an implementation, the searching module 101 is further configured to: when it is necessary to traverse from any node to a latter node of the any node, apply for adding a shared lock for a memory page corresponding to the latter node, and after successfully adding the shared lock for the memory page corresponding to the latter node, release a shared lock of a memory page corresponding to the any node.

In an implementation, the modifying module 102 is further configured to: for any node with the preset mark set by itself, if a neighbor node of the any node needs to be changed, set in the any node a pointer pointing to the new neighbor node of the any node.

In an implementation, the searching module 101 is further configured to: if a certain memory page has been set with the preset mark by another data operation apparatus to trigger the data operation apparatus to release the lock it holds, wait for the preset mark of the certain memory page to be cleared, and then retraverse from the root node to search the target index record.

The apparatus shown in FIG. 10 can perform the method of the embodiment shown in FIG. 4, the part not described in detail in the embodiment can refer to relevant description of the embodiment shown in FIG. 4. The performing process and technical effect of the technical solution refer to the description in the embodiment shown in FIG. 4, and will not be repeated here.

Figure 11:
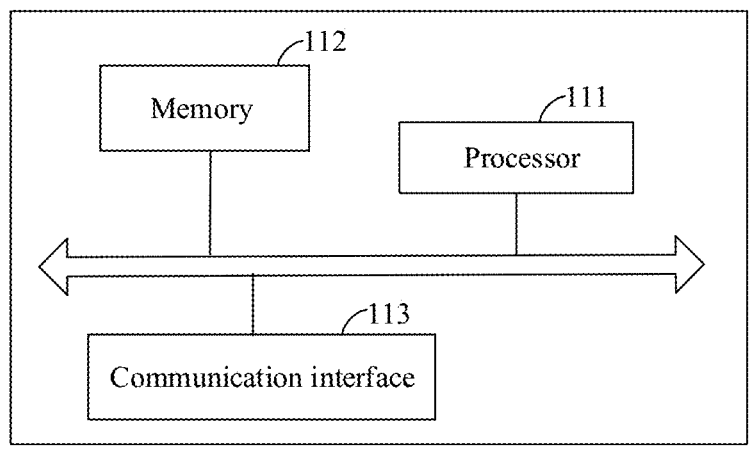
FIG. 11 is a schematic structural diagram of a computer device according to an embodiment of the present application.

In a possible implementation, the structure of the apparatus shown in FIG. 10 can be implemented as a computer device. As shown in FIG. 11, the computer device may include a processor 111 and a memory 112. The memory 112 is configured to store a program that supports the computer device to perform the method provided in the embodiment shown in FIG. 4, and the processor 111 is configured to execute the program stored in the memory 112.

The program includes one or more computer instructions, where when the one or more computer instructions are executed by the processor 111, the following steps can be implemented.

A writing thread traverses from a root node of the multiway tree to search a target index record matching a search keyword of a writing operation, so as to find a target node where the target index record is located.

If the writing operation needs to trigger a structure modification operation, the writing thread applies for adding, according to a locking rule, exclusive locks for memory pages corresponding to the target node and other nodes needing associated modification, so as to modify the target node and the other nodes accordingly after successfully adding the exclusive locks for the target node and the other nodes; where the locking rule includes: if a direction from any node to an associated node does not meet a requirement of a locking direction, on the basis of holding an exclusive lock of a memory page corresponding to the any node and before applying for adding an exclusive lock for a memory page corresponding to the associated node, the exclusive lock of the memory page corresponding to the any node needs to be released and a preset mark needs to be set for the memory page corresponding to the any node; and a lock held by itself needs to be released if any memory page for which adding an exclusive lock is applied has been set with the preset mark by another writing thread.

In an implementation, the processor 111 is further configured to perform all or part of the steps in the aforementioned embodiment shown in FIG. 4.

The structure of the computer device may further include a communication interface 113 configured for the computer device to communicate with other devices or communication networks.

In addition, an embodiment of the present application provides a computer-readable storage medium having a computer program stored thereon, where when the computer program is executed, the method described in the embodiment shown in FIG. 4 is implemented.

The apparatus embodiment described above is only schematic, in which the units described as separate components may or may not be physically separated, and components displaying as units may or may not be physical units, that is, they may be located in one place or distributed to multiple network units. Some or all of the modules can be selected according to actual requirements to achieve the purpose of the solution of the embodiment. Those skilled in the art can understand and implement without paying creative efforts.

By the description of the above embodiments, those skilled in the art can clearly understand that the implementations can be realized by adding a necessary general hardware platform, or can be realized by combining hardware and software. Based on such understanding, the essence of the above solution or the part that has contributed to the prior art can be embodied in a form of a computer product, and the present application can take the form of a computer program product implemented on one or more computer-usable storage media (including but not limited to a disk storage, a CD-ROM, an optical storage, etc.) containing computer-usable program codes.

The present application is described with reference to flowcharts and/or block diagrams of the method, the device (the system), and the computer program product according to the embodiments of the present application. It should be understood that each flow and/or block in the flowcharts and/or block diagrams, and combinations of the process and/or block in the flowcharts and/or block diagrams can be implemented by computer program instructions. These computer program instructions can be provided to a general purpose computer, a special purpose computer, an embedded processor or a processor of other programmable device to produce a machine, such that the instructions executed by the computer or the processor of other programmable device produce an apparatus used for implementing specified functions in one or more processes of the flowchart and/or one or more blocks of the block diagram.

These computer program instructions may also be stored in a computer-readable memory that can guide a computer or other programmable devices to work in a particular manner, such that the instructions stored in the computer-readable memory produce a manufacture including instruction apparatus, the instruction apparatus implements specified functions in one or more processes of the flowchart and/or one or more blocks of the block diagram.

These computer program instructions may also be loaded onto a computer or other programmable devices, such that a series of operation steps are performed on the computer or the other programmable devices to produce a computer-implemented process, such that the instructions executed on the computer or the other programmable devices provide steps for implementing specified functions in one or more processes of the flowchart and/or one or more blocks of the block diagram.

In a typical configuration, a computing device includes one or more processors (central processing unit, CPU), an input/output interface, a network interface, and a memory.

The memory may include a non-permanent memory, a random access memory (RAM) and/or a nonvolatile memory (such as a read-only memory (ROM) or a flash memory (flash RAM)) in the computer-readable medium. The memory is an example of the computer-readable medium.

The computer-readable medium, including permanent and non-permanent, removable and non-removable media, can store information by any method or technology. Information can be computer-readable instructions, linked lists, modules of a program or other data. Examples of computer storage media include, but not limited to a phase-change memory (PRAM), a static random access memory (SRAM), a dynamic random access memory (DRAM), a random access memory (RAM) of other types, a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette tape, a magnetic tape magnetic disk storage or other magnetic storage devices or any other non-transmission medium, which can be used to store information that can be accessed by a computing device. According to the definition herein, the computer-readable medium does not include a transitory computer-readable media (transitory media), such as modulated data signals and carrier waves.

Finally, it should be noted that the above embodiments are only used to illustrate the technical solutions of the present application, but not to limit it. Although the present application has been described in detail with reference to the foregoing embodiments, it should be understood by those skilled in the art that they can still modify the technical solutions described in the foregoing embodiments or substitute some or all technical features with equivalents. However, these modifications or substitutions do not make the essence of the corresponding technical solutions deviate from the scope of the technical solutions of various embodiments of the present application.

The invention claimed is:

1. A database operation method, wherein the database uses a multiway tree as an index, a one-to-one correspondence is between nodes of the multiway tree and memory pages, and the method comprises:
   traversing, by a writing thread, from a root node of the multiway tree to search a target index record matching a search keyword of a writing operation, to find a target node where the target index record is located; and
   upon determining that the writing operation needs to trigger a structure modification operation, applying for, by the writing thread according to a locking rule, exclusive locks for memory pages corresponding to the target node and other nodes needing associated modification, to modify the target node and the other nodes accordingly after successfully adding the exclusive locks on the target node and the other nodes; wherein the locking rule comprises: upon determining that a direction from any node to an associated node does not meet a requirement of a locking direction, and that the writing thread holds an exclusive lock of a memory page corresponding to the any node, before applying for an exclusive lock for a memory page corresponding to the associated node, the exclusive lock of the memory page corresponding to the any node needs to be released and a preset mark needs to be set for the memory page corresponding to the any node; and a lock held by the writing thread needs to be released if any memory page for which the writing thread applies for an exclusive lock has been set with the preset mark by another writing thread.

2. The method according to claim 1, wherein the locking direction comprises a top-to-down direction and a left-to-right direction along the multiway tree.

3. The method according to claim 2, wherein the writing operation is an inserting operation, and a node needs to be added on a right side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for memory pages corresponding to the target node and a neighbor node on the right side of the target node, and applying for a new memory page to serve as a new node, wherein the writing thread holds an exclusive lock of the new memory page;

after successfully adding the exclusive locks on the memory pages corresponding to the target node and the neighbor node on the right side, moving, by the writing thread, a part of index records in the target node to the new node, inserting an index record needed to be inserted in the inserting operation into the new node, and inserting the new node between the target node and the neighbor node by modifying index records in the target node, the new node and the neighbor node; and setting, by the writing thread, the preset mark for memory pages corresponding to the target node, the new node and the neighbor node, releasing exclusive locks of the memory pages corresponding to the target node, the new node and the neighbor node, applying for an exclusive lock for a memory page corresponding to a father node of the target node, and after successfully adding the exclusive lock on the memory page corresponding to the father node, inserting, by the writing thread, the new node under the father node by adding in the father node an index record corresponding to the new node.

4. The method according to claim 2, wherein the writing operation is an inserting operation, and a node needs to be added on a left side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for memory pages corresponding to the target node and a neighbor node on the left side of the target node, and applying for a new memory page to serve as a new node, wherein the writing thread holds an exclusive lock of the new memory page;

after successfully adding the exclusive locks on the memory pages corresponding to the target node and the neighbor node on the left side, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, inserting the new node under the father node by modifying an index record in the father node originally pointing to the target node to point to the new node;

after the applying for, by the writing thread, the exclusive locks for the memory pages corresponding to the target node and the neighbor node and successfully adding the exclusive locks on the memory pages corresponding to the target node and the neighbor node, moving a part of index records in the target node to the new node, inserting an index record needed to be inserted in the inserting operation into the new node, and inserting the new node between the target node and the neighbor node by modifying index records in the target node, the new node and the neighbor node; and inserting, by the writing thread, the target node under the father node by adding in the father node an index record corresponding to the target node.

5. The method according to claim 2, wherein the writing operation is a deleting operation, and the target node needs to be deleted; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for memory pages corresponding to the target node and a neighbor node of the target node;

after successfully adding the exclusive locks on the memory pages corresponding to the target node and the neighbor node, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, deleting the target node from under the father node by deleting in the father node an index record corresponding to the target node; and applying for, by the writing thread, exclusive locks for the memory pages corresponding to the target node and the neighbor node, deleting the target node from the multiway tree by modifying an index record in the neighbor node after successfully adding an exclusive lock on the memory page corresponding to the neighbor node, and releasing the memory page corresponding to the target node after successfully adding an exclusive lock on the target node.

6. The method according to claim 2, wherein the writing operation is a deleting operation, and remaining index records in the target node need to be merged to a neighbor node on a left side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for the memory pages corresponding to the target node and the neighbor node;

after successfully adding an exclusive lock on the memory page corresponding to the target node, deleting, by the writing thread, the target index record in the target node;

after successfully adding the exclusive locks on the memory pages corresponding to the target node and the neighbor node, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, deleting the target node from under the father node by deleting in the father node an index record corresponding to the target node; and applying for, by the writing thread, exclusive locks for the memory pages corresponding to the target node and the neighbor node, and after successfully adding the exclusive locks on the memory pages corresponding to the target node and the neighbor node, moving the remaining index records in the target node to the neighbor node on the left side of the target node, deleting the target node from the multiway tree by modifying an index record in the neighbor node of the target node, and releasing the memory page corresponding to the target node.

7. The method according to claim 2, wherein the writing operation is a deleting operation, and remaining index records in the target node need to be merged to a neighbor node on a right side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for the memory pages corresponding to the target node and the neighbor node;

after successfully adding an exclusive lock on the memory page corresponding to the target node, deleting, by the writing thread, the target index record in the target node;

after successfully adding the exclusive locks on the memory pages corresponding to the target node and the neighbor node, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, deleting the neighbor node on the right side of the target node from under the father node by deleting in the father node an index record corresponding to the neighbor node on the right side of the target node, and inserting the neighbor node on the right side of the target node under the father node by modifying an index record in the father node originally pointing to the target node to point to the neighbor node on the right side of the target node; and applying for, by the writing thread, exclusive locks for the memory pages corresponding to the target node and the neighbor node, and after successfully adding the exclusive locks on the memory pages corresponding to the target node and the neighbor node, moving the remaining index records in the target node to the neighbor node on the right side of the target node, deleting the target node from the multiway tree by modifying an index record in the neighbor node of the target node, and releasing the memory page corresponding to the target node.

8. The method according to claim 1, wherein the exclusive lock of the memory page corresponding to the any node needing to be released and the preset mark needing to be set for the memory page corresponding to the any node comprises: releasing the exclusive lock of the memory page corresponding to the any node and adding a read-write lock on the memory page corresponding to the any node needing to be done at the same time.

9. The method according to claim 1, wherein the writing operation is an inserting operation, and a node needs to be added on a right side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for memory pages corresponding to the target node and a neighbor node on the right side of the target node, and applying for a new memory page to serve as a new node, wherein the writing thread holds an exclusive lock of the new memory page;

after successfully adding the exclusive locks on the memory pages corresponding to the target node and the neighbor node on the right side, moving, by the writing thread, a part of index records in the target node to the new node, inserting an index record needed to be inserted in the inserting operation into the new node, and inserting the new node between the target node and the neighbor node by modifying index records in the target node, the new node and the neighbor node; and setting, by the writing thread, the preset mark for memory pages corresponding to the target node, the new node and the neighbor node, releasing exclusive locks of the memory pages corresponding to the target node, the new node and the neighbor node, applying for an exclusive lock for a memory page corresponding to a father node of the target node, and after successfully adding the exclusive lock on the memory page corresponding to the father node, inserting, by the writing thread, the new node under the father node by adding in the father node an index record corresponding to the new node.

10. The method according to claim 1, wherein the writing operation is an inserting operation, and a node needs to be added on a left side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for memory pages corresponding to the target node and a neighbor node on the left side of the target node, and applying for a new memory page to serve as a new node, wherein the writing thread holds an exclusive lock of the new memory page;

after successfully adding the exclusive locks on the memory pages corresponding to the target node and the neighbor node on the left side, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, inserting the new node under the father node by modifying an index record in the father node originally pointing to the target node to point to the new node;

after the applying for, by the writing thread, the exclusive locks for the memory pages corresponding to the target node and the neighbor node and successfully adding the exclusive locks on the memory pages corresponding to the target node and the neighbor node, moving a part of index records in the target node to the new node, inserting an index record needed to be inserted in the inserting operation into the new node, and inserting the new node between the target node and the neighbor node by modifying index records in the target node, the new node and the neighbor node; and inserting, by the writing thread, the target node under the father node by adding in the father node an index record corresponding to the target node.

11. The method according to claim 1, wherein the writing operation is a deleting operation, and the target node needs to be deleted; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for memory pages corresponding to the target node and a neighbor node of the target node;

after successfully adding the exclusive locks on the memory pages corresponding to the target node and the neighbor node, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, deleting the target node from under the father node by deleting in the father node an index record corresponding to the target node; and applying for, by the writing thread, exclusive locks for the memory pages corresponding to the target node and the neighbor node, deleting the target node from the multiway tree by modifying an index record in the neighbor node after successfully adding an exclusive lock on the memory page corresponding to the neighbor node, and releasing the memory page corresponding to the target node after successfully adding an exclusive lock on the target node.

12. The method according to claim 1, wherein the writing operation is a deleting operation, and remaining index records in the target node need to be merged to a neighbor node on a left side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for the memory pages corresponding to the target node and the neighbor node;

after successfully adding an exclusive lock on the memory page corresponding to the target node, deleting, by the writing thread, the target index record in the target node;

after successfully adding the exclusive locks on the memory pages corresponding to the target node and the neighbor node, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, deleting the target node from under the father node by deleting in the father node an index record corresponding to the target node; and applying for, by the writing thread, exclusive locks for the memory pages corresponding to the target node and the neighbor node, and after successfully adding the exclusive locks on the memory pages corresponding to the target node and the neighbor node, moving the remaining index records in the target node to the neighbor node on the left side of the target node, deleting the target node from the multiway tree by modifying an index record in the neighbor node of the target node, and releasing the memory page corresponding to the target node.

13. The method according to claim 1, wherein the writing operation is a deleting operation, and remaining index records in the target node need to be merged to a neighbor node on a right side of the target node; and the applying for, by the writing thread according to the locking rule, the exclusive locks for the memory pages corresponding to the target node and the other nodes needing associated modification, to modify the target node and the other nodes accordingly after successfully adding the exclusive locks on the target node and the other nodes comprises:

applying for, by the writing thread, exclusive locks for the memory pages corresponding to the target node and the neighbor node;

after successfully adding an exclusive lock on the memory page corresponding to the target node, deleting, by the writing thread, the target index record in the target node;

after successfully adding the exclusive locks on the memory pages corresponding to the target node and the neighbor node, setting, by the writing thread, the preset mark for the memory pages corresponding to the target node and the neighbor node, releasing the exclusive locks of the memory pages corresponding to the target node and the neighbor node, applying for an exclusive lock for a memory page corresponding to a father node of the target node, and after successfully adding the exclusive lock on the memory page corresponding to the father node, deleting the neighbor node on the right side of the target node from under the father node by deleting in the father node an index record corresponding to the neighbor node on the right side of the target node, and inserting the neighbor node on the right side of the target node under the father node by modifying an index record in the father node originally pointing to the target node to point to the neighbor node on the right side of the target node; and applying for, by the writing thread, exclusive locks for the memory pages corresponding to the target node and the neighbor node, and after successfully adding the exclusive locks on the memory pages corresponding to the target node and the neighbor node, moving the remaining index records in the target node to the neighbor node on the right side of the target node, deleting the target node from the multiway tree by modifying an index record in the neighbor node of the target node, and releasing the memory page corresponding to the target node.

14. The method according to claim 1, wherein the method further comprises: if a certain memory page has been set with the preset mark by another writing thread to trigger the writing thread to release a lock that the writing thread holds, the writing thread waits for the preset mark of the certain memory page to be cleared, and retraverses from the root node to search the target index record.

15. The method according to claim 1, wherein the method further comprises: when there is a need to traverse from any node to a latter node of the any node, applying for, by the writing thread, a shared lock for a memory page corresponding to the latter node, and after successfully adding the shared lock on the memory page corresponding to the latter node, releasing a shared lock of a memory page corresponding to the any node.

16. The method according to claim 1, wherein the method further comprises: for any node with the preset mark set by the writing thread, upon determining that a neighbor node of the any node needs to be changed, setting in the any node a pointer pointing to the new neighbor node of the any node.

17. A computer device comprising: a memory and a processor, wherein the memory is used for storing one or more computer instructions, and the one or more computer instructions are executed by the processor for a writing thread to perform the following steps:

traversing from a root node of a multiway tree to search a target index record matching a search keyword of a writing operation, to find a target node where the target index record is located; and upon determining that the writing operation needs to trigger a structure modification operation, applying for, according to a locking rule, exclusive locks for memory pages corresponding to the target node and other nodes needing associated modification, to modify the target node and the other nodes accordingly after successfully adding the exclusive locks on the target node and the other nodes; wherein the locking rule comprises: upon determining that a direction from any node to an associated node does not meet a requirement of a locking direction, and that the writing thread holds an exclusive lock of a memory page corresponding to the any node, before applying for adding an exclusive lock for a memory page corresponding to the associated node, the exclusive lock of the memory page corresponding to the any node needs to be released and a preset mark needs to be set for the memory page corresponding to the any node; and a lock held by the writing thread needs to be released if any memory page for which the writing thread applies for an exclusive lock has been set with the preset mark by another writing thread.

18. The computer device according to claim 17, wherein the locking direction comprises a top-to-down direction and a left-to-right direction along the multiway tree.

19. The computer device according to claim 17, wherein the exclusive lock of the memory page corresponding to the any node needing to be released and the preset mark needing to be set for the memory page corresponding to the any node comprises: releasing the exclusive lock of the memory page corresponding to the any node and adding a read-write lock on the memory page.

20. A non-transitory computer-readable storage medium having a computer program stored thereon, wherein the computer program is executed for a writing thread to perform the following steps:

traversing from a root node of a multiway tree to search a target index record matching a search keyword of a writing operation, to find a target node where the target index record is located; and upon determining that the writing operation needs to trigger a structure modification operation, applying for, according to a locking rule, exclusive locks for memory pages corresponding to the target node and other nodes needing associated modification, to modify the target node and the other nodes accordingly after successfully adding the exclusive locks on the target node and the other nodes; wherein the locking rule comprises: upon determining that a direction from any node to an associated node does not meet a requirement of a locking direction, and that the writing thread holds an exclusive lock of a memory page corresponding to the any node, before applying for an exclusive lock for a memory page corresponding to the associated node, the exclusive lock of the memory page corresponding to the any node needs to be released and a preset mark needs to be set for the memory page corresponding to the any node; and a lock held by the writing thread needs to be released if any memory page for which the writing thread applies for an exclusive lock has been set with the preset mark by another writing thread.

* * * * *